United States Patent
Katagai et al.

(10) Patent No.: US 9,737,818 B2
(45) Date of Patent: Aug. 22, 2017

(54) SCORE-BASED GAME SYSTEM DETERMINING WHETHER USE OF GAME DATA IS PERMITTED BASED ON A THRESHOLD, SERVER, PROGRAM, AND GAME METHOD FOR SUCH SYSTEM

(71) Applicant: KONAMI DIGITAL ENTERTAINMENT CO., LTD., Minato-ku, Tokyo (JP)

(72) Inventors: Tahei Katagai, Yokohama (JP); Tomoaki Koguchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 952 days.

(21) Appl. No.: 13/649,400

(22) Filed: Oct. 11, 2012

(65) Prior Publication Data
US 2013/0260877 A1    Oct. 3, 2013

(30) Foreign Application Priority Data
Apr. 2, 2012  (JP) ................................. 2012-083770

(51) Int. Cl.
*A63F 13/814*    (2014.01)
*A63F 13/63*     (2014.01)
(Continued)

(52) U.S. Cl.
CPC ............ *A63F 13/814* (2014.09); *A63F 13/33* (2014.09); *A63F 13/60* (2014.09); *A63F 13/63* (2014.09);
(Continued)

(58) Field of Classification Search
CPC .......... A63F 13/55; A63F 13/56; A63F 13/57; A63F 13/60; A63F 13/63; A63F 13/65;
(Continued)

(56) References Cited

U.S. PATENT DOCUMENTS 6,119,229 A *  9/2000  Martinez ................. A63F 13/12
                                                      726/28
6,347,998 B1 * 2/2002  Yoshitomi ................ G10H 1/00
                                                      273/148 R
(Continued)

FOREIGN PATENT DOCUMENTS

JP    2000-300838 A    10/2000
JP    2000-308758 A    11/2000
(Continued)

OTHER PUBLICATIONS

Office Action, dated Feb. 18, 2014, issued by the Japanese Patent Office, in counterpart Application No. 2012-083770.

*Primary Examiner* — William H McCulloch, Jr.
(74) *Attorney, Agent, or Firm* — Sughrue Mion, PLLC

(57) ABSTRACT

A game system includes a generating unit that generates game data used in progression through a game, based on player's instruction information input to a first terminal of a plurality of terminals. The system also includes a progression unit that makes the game progression, using the game data generated by the generating unit. The system also includes a determining unit that makes a determination regarding prohibition of use of the game data by at least a terminal other than the first terminal of the plurality of terminals, based on at least one playing result for a player that plays the game that the progression unit progresses using the game data generated by the generating unit based on the player's instruction information. The system also includes a control unit that controls the prohibition of use of the game data, based on the result of the determination by the determining unit.

18 Claims, 11 Drawing Sheets

(51) Int. Cl.
*A63F 13/60* (2014.01)
*A63F 13/73* (2014.01)
*A63F 13/67* (2014.01)
*A63F 13/65* (2014.01)
*A63F 13/33* (2014.01)
*A63F 13/56* (2014.01)
*A63F 13/57* (2014.01)
*A63F 13/55* (2014.01)

(52) U.S. Cl.
CPC .............. *A63F 13/73* (2014.09); *A63F 13/55* (2014.09); *A63F 13/56* (2014.09); *A63F 13/57* (2014.09); *A63F 13/65* (2014.09); *A63F 13/67* (2014.09); *A63F 2300/558* (2013.01); *A63F 2300/6018* (2013.01); *A63F 2300/8047* (2013.01)

(58) Field of Classification Search
CPC .................. A63F 13/67; A63F 2300/64; A63F 2300/6018; A63F 2300/8047
USPC ....................................... 463/29, 35
See application file for complete search history.

(56) References Cited

U.S. PATENT DOCUMENTS

| | | | |
|---|---|---|---|
| 6,450,888 B1* | 9/2002 | Takase | A63F 13/10 434/250 |
| 7,517,282 B1* | 4/2009 | Pryor | A63F 13/12 463/1 |
| 7,758,427 B2* | 7/2010 | Egozy | A63F 13/12 463/31 |
| 7,772,480 B2* | 8/2010 | Brennan | G09B 5/06 434/307 A |
| 7,846,022 B2* | 12/2010 | Chiwata | A63F 13/06 463/35 |
| 9,037,725 B2* | 5/2015 | Guest | H04L 67/10 463/42 |
| 9,305,420 B2* | 4/2016 | Arnone | G07F 17/326 |
| 9,330,533 B2* | 5/2016 | Arnone | G07F 17/3241 |
| 2004/0242321 A1* | 12/2004 | Overton | G06F 21/128 463/29 |
| 2006/0258447 A1* | 11/2006 | Baszucki | A63F 13/12 463/31 |
| 2009/0258686 A1* | 10/2009 | McCauley | A63F 13/06 463/7 |
| 2009/0327723 A1* | 12/2009 | Yates | G06Q 10/06 713/168 |
| 2010/0041455 A1 | 2/2010 | Kura et al. | |
| 2012/0071238 A1* | 3/2012 | Bala | A63F 13/54 463/31 |
| 2013/0150158 A1* | 6/2013 | Kang | G07F 17/3223 463/31 |
| 2013/0260877 A1* | 10/2013 | Katagai | A63F 13/10 463/29 |
| 2014/0007118 A1* | 1/2014 | Katagai | G06F 9/54 718/102 |

FOREIGN PATENT DOCUMENTS

| | | |
|---|---|---|
| JP | 2009-233104 A | 10/2009 |
| KR | 10-2009-0013410 A | 2/2009 |
| KR | 10-2009-0108714 A | 10/2009 |
| KR | 10-2010-0124578 A | 11/2010 |

* cited by examiner

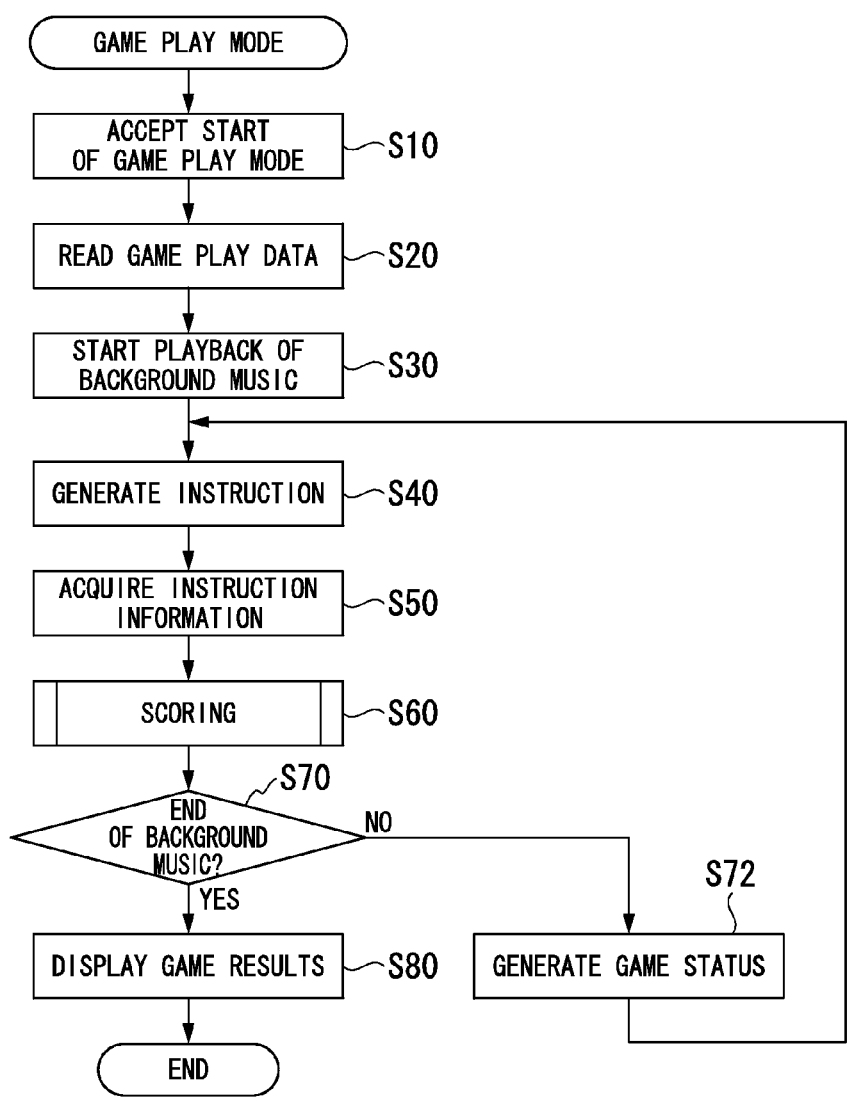

US 9,737,818 B2

SCORE-BASED GAME SYSTEM DETERMINING WHETHER USE OF GAME DATA IS PERMITTED BASED ON A THRESHOLD, SERVER, PROGRAM, AND GAME METHOD FOR SUCH SYSTEM

BACKGROUND OF THE INVENTION

Field of the Invention

The present invention relates to a game system, a server, a program, and a game method.

Priority is claimed on Japanese Patent Application No. 2012-083770, filed Apr. 2, 2012, the content of which is incorporated herein by reference.

Related Art

There have been game systems in which game data supplied from a server to a terminal is used to progress through a game. Such game systems are designed to allow not only that the game system administrator generates game data, but also that a player can generate game data by operating a terminal. Japanese Laid-Open Patent Publication No. 2000-300838 discloses an example of such a game system.

In a game system such as noted above, game data generated by a player operating a terminal may include such game data as having an excessively high level of difficulty when used for a game. Some of such game data generated by a player operating a terminal may include game data with which a player would never be able to get through to the goal of the game, regardless of what operations were made. In a game system such as this, if game data with an excessively high difficulty level or game data that can prevent a player from reaching the goal of the game is supplied to the terminal, the player playing the game using the game data could feel dissatisfaction.

SUMMARY

In one aspect of the present invention, a game system may include, but is not limited to, a generating unit, a progression unit, a determining unit, and a control unit. The generating unit is configured to generate game data, which is to be used in a game progression. The generation is based on player's instruction information input to a first terminal of a plurality of terminals. The progression unit is configured to make the game progression, using the game data generated by the generating unit. The determining unit is configured to make a determination regarding prohibition of use of the game data by at least a terminal other than the first terminal of the plurality of terminals. The determination is made based on at least one playing result for a player that plays the game that the progression unit progresses by using the game data generated by the generating unit based on the player's instruction information. The control unit is configured to control the prohibition of use of the game data, based on the result of the determination by the determining unit.

In another aspect of the present invention, the determining unit may be configured to determine prohibition of uploading to supply the game data generated by the generating unit from the first terminal to a server capable of communicating via a communication network with the plurality of terminals. The prohibition of uploading is determined as the prohibition of use of the game data.

In another aspect of the present invention, the determining unit may be configured to determine prohibition of a storage unit that stores the game data from storing the game data generated by the generating unit. The prohibition of the storage unit is determined as prohibition of the use of the game data.

In another aspect of the present invention, the determining unit may be configured to determine the prohibition of downloading to supply the game data generated by the generating unit from a server capable of communicating via a communication network with a terminal to a terminal. The prohibition of downloading is determined as prohibition of the use of the game data.

In another aspect of the present invention, the determining unit may be configured to determine prohibition of the game progression by the progression unit using the game data generated by the generating unit. The prohibition of the game progression is determined as prohibition of the use of the game data.

In another aspect of the present invention, the determining unit may be configured to make a determination to prohibit the use of the game data generated by the generating unit, if the playing results do not satisfy a given condition.

In another aspect of the present invention, the game system may further include, but is not limited to, a correction unit configured to correct the game data, based on at least one playing result for a player that plays the game that the progression unit progresses by using the game data generated by the generating unit based on player's instruction information.

In another aspect of the present invention, the correction unit may be configured to correct the game data generated by the generating unit, based on one playing result or on an average of a plurality of playing results.

In another aspect of the present invention, the correction unit may be configured to correct the game data by changing information indicating the timing of input of player's instruction information that is included in the game data generated by the generating unit, the game data being corrected based on at least one playing result.

In another aspect of the present invention, the determining unit may be configured to make a determination regarding prohibition of use of the game data, based on at least one playing result of the game through which the progression unit progresses by using the game data corrected by the correction unit.

In another aspect of the present invention, the determining unit may be configured to make a determination regarding prohibition of use of the game data, based on the difference between a first timing of input of player's instruction information included in the game data generated by the generating unit and a second timing of input of player's instruction information by a player that plays the game through which the progression unit progresses using the game data.

In another aspect of the present invention, a server may a server configured to permit at least one terminal other than a first terminal of a plurality of terminals to use acquired game data, and the server may include, but is not limited to, an acquisition determining unit, and an acquisition control unit. The acquisition determining unit is configured to make a determination regarding whether to acquire game data from the first terminal, based on a result of determination on prohibition of use of the game data. The game data have been generated based on player's instruction information input to the first terminal. The determination on the prohibition of use of the game data have been made based on at least one playing result for a player that plays the game that is progressed through by using the game data. The acquisition control unit may be configured to control the prohibition of the acquisition of the game data from the first terminal, based on the result of the determination made by the acquisition determination unit.

In another aspect of the present invention, a game method may include, but is not limited to: generating game data for use in progressing through a game, based on player's instruction information input to a first terminal of a plurality of terminals; progressing through the game using the generated game data; making a determination regarding prohibition of use of the game data by at least one terminal other than the first terminal of the plurality of terminals, the determination regarding the prohibition being made based on at least one playing result for a player that plays the game that is progressed through by using the generated game data; and controlling the prohibition of use of the game data, based on the result of the determination regarding the prohibition.

In another aspect of the present invention, a non-transitory computer-readable storing medium stores a program to be executed to perform a game method. The game method may include, but is not limited to: generating game data for use in progressing through a game, based on player's instruction information input to a first terminal of a plurality of terminals; progressing through the game using the generated game data; making a determination regarding prohibition of use of the game data by at least one terminal other than the first terminal of the plurality of terminals, the determination regarding the prohibition being made based on at least one playing result for a player that plays the game that is progressed through by using the generated game data; and controlling the prohibition of use of the game data, based on the result of the determination regarding the prohibition.

In another aspect of the present invention, a non-transitory computer-readable storing medium stores a program to be executed to perform a player's instruction information supplying method. The player's instruction information supplying method may include, but is not limited to: supplying a first piece of player's instruction information from a first terminal to a game data generator to permit the game data generator to generate, based on the first player's instruction information, game data for use in progressing through a game; and supplying a second player's instruction information, which is different in generation timing from the first piece of player's instruction information, from the first terminal to a progression unit, to permit the progression unit to progress through the game by using the game data, and to permit a determining unit to make a determination regarding prohibition of use of the game data by at least one terminal other than the first terminal of a plurality of terminals, the determination regarding the prohibition being made based on at least one result of game progression made by the progression unit based on the second player's instruction information.

BRIEF DESCRIPTION OF THE DRAWINGS

FIG. 6 is a drawing showing an example of information indicating a playing results stored by a terminal storage unit of the first embodiment of the present invention;

FIG. 7 is a flowchart showing an example of game operation in a game play mode of the game system of the first embodiment of the present invention;

DETAILED DESCRIPTION OF THE PREFERRED EMBODIMENTS

First Embodiment

The first embodiment of the present invention will be described, with references to the drawings.

Figure 1:
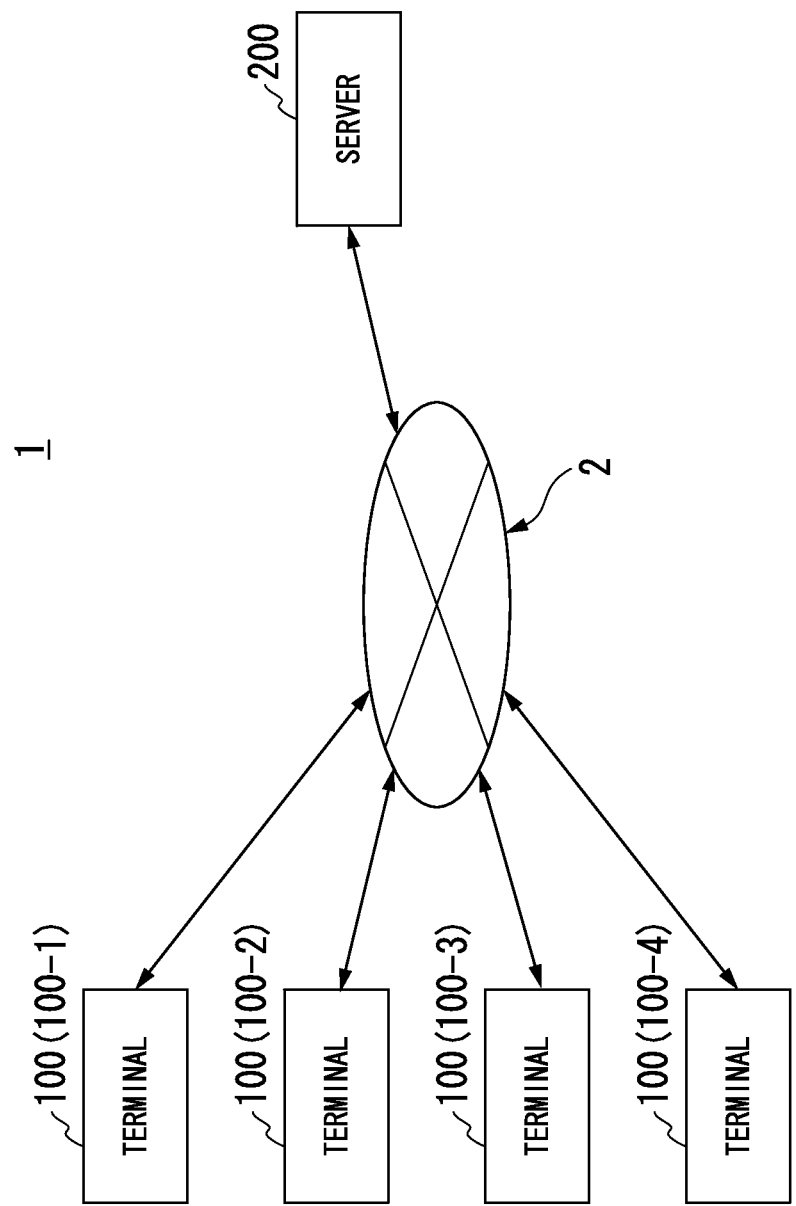
FIG. 1 is a diagram illustrating an example of the configuration of a game system in accordance with the first embodiment of the present invention.

FIG. 1 is a drawing that shows an example of the configuration of a game system 1 according to the first embodiment of the present invention. The game system 1 includes a plurality of terminals 100 (for example, terminals 100-1 to 100-4), a server 200, and a network 2. Because the terminals 100-1 to 100-4 have the same configuration, unless a specific distinction is made, they will be referred to as the terminals 100.

The network 2 is a wireless or wired communication network that performs communication between the server 200 and the plurality of terminals 100, and this may be, for example, a mobile phone network or the Internet, although the network is not restricted in this manner.

The server 200 is configured to communicate with the plurality of terminals 100 via the network 2, and to supply game data that is stored by the server 200 to the terminals 100. The term "game data" as used herein refers to game data that is used when a terminal 100 is progressing through a game. The game data stored by the server 200 includes game data that is generated by a player using a terminal 100 in addition to data generated by the game administrator and stored beforehand in the server 200. Game data generated by a player using a terminal 100 (terminal 100-1) (first terminal) is transmitted (uploaded) to the server 200 via the network 2, and further transmitted (downloaded or distributed) to the other terminals 100 (terminals 100-2 to 100-4) from the server 200 via the network 2. The server 200 is configured to store game data received from a terminal 100 via the network 2 and to transmit the stored game data to the other terminals 100 via the network 2. The server 200 may also be configured to transmit the stored game data to the terminal 100-1 that has generated the game data.

The terminals 100 may typically be computers used by players, and may be configured to provide players with a game that uses the game data supplied from the server 200. Typical examples of the terminal 100 may include, but are not limited to, PC (personal computer), a tablet computer, a smart phone, a feature phone and the like. The terminal 100 may be configured to execute a "game play mode" and a "game data edit mode" (hereinafter referred simply and collectively to as the edit mode) in response to a player's selection. The game play mode may typically be a mode in which the game is progressed through, using game data that is received from the server 200 via the network 2.

The edit mode may be a mode in which a player generates game data, using the terminal 100. The terminal 100 may be configured to upload, to the server 200, game data that is generated by a player in the edit mode. The terminal 100 may be configured to, when uploading, determine whether or not a criterion for permission for use (or denial of permission for use) of the game data generated by the player by other terminals 100 has been satisfied. Then, of the game data, the terminal 100 may be configured to upload, to the server 200, only game data which has been determined as having satisfied the criterion for permission for use. When a player has played a game with game data generated by the player itself, the terminal 100 may be configured to make the determination regarding permission for use according to whether the playing result of the game is a predetermined result. Typical examples of the predetermined result may be, but are not limited to, in addition to the score or misses, whether the number objects OB that have been determined as being non-missed exceeds a predetermined threshold value). The configurations of the terminal 100 and the server 200 will be described in details below. The configuration of the terminal 100 will be described with references made to FIG. 2.

Figure 2:
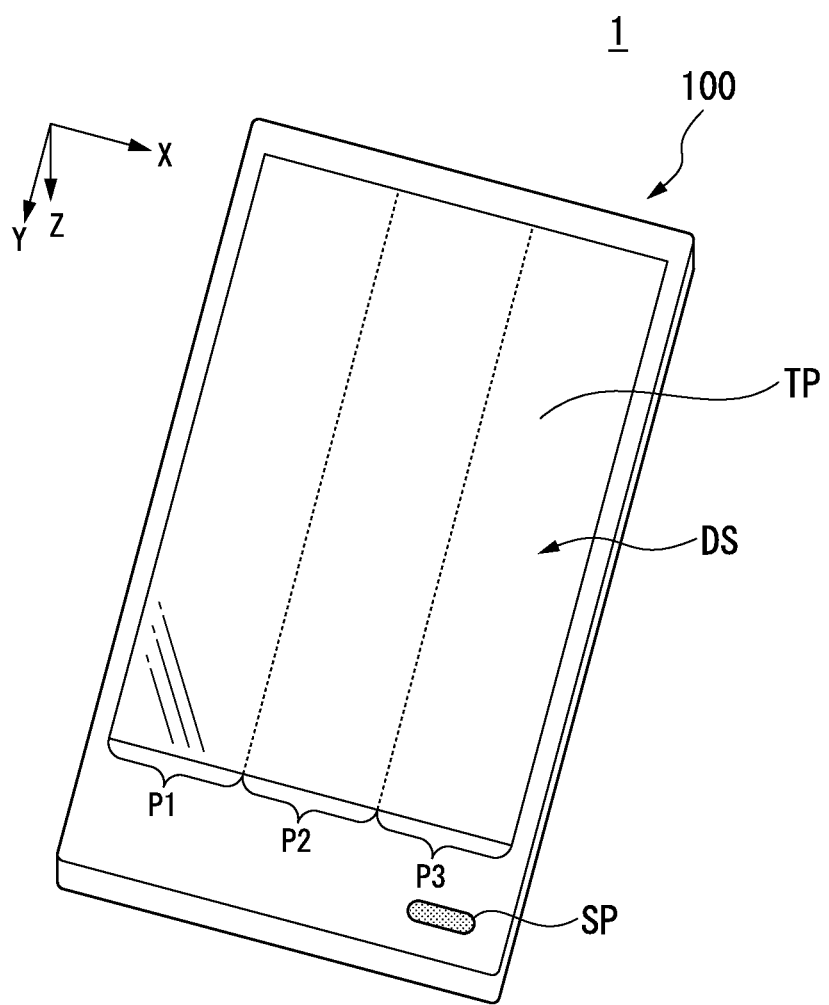
FIG. 2 is a perspective view illustrating a terminal of the first embodiment of the present invention.

FIG. 2 is a view that shows an example of the configuration of the terminal 100 according to the present embodiment. The terminal 100 includes a display unit DS that may be configured to display an image, an operation detection unit TP that detects an operation by a player, and a sound output unit SP that outputs sound. When necessary in the descriptions of drawings that follow, XYZ orthogonal coordinates will be established and the positional relationships of various parts will be described in terms of the XYZ orthogonal coordinate system. The direction of display by the display unit DS is taken to be the negative direction along the Z axis, and the vertical and horizontal directions on a plane that intersects perpendicularly with the Z-axis direction are taken, respectively, as the Y axis and the X axis. In this case, the Y-axis direction is taken as the direction of longer side of the display unit DS and the X-axis direction is taken as the direction of the shorter side of the display unit DS.

The display unit DS may have an image display panel such as a liquid-crystal panel or an organic EL panel. The display unit DS may be configured to display an image, based on an input image signal. The sound output unit SP may have a speaker, and outputs sound, based on an input sound signal.

The operation detection unit TP may have a touch sensor on the image display panel of the display unit DS. The operation detection unit TP may be configured to detect an operation by a player playing a game, and to output information that indicates the detected operation. In this case, the operation detection unit TP may be configured to detect the position on the surface of the image display panel at which a player has made an operation (operation position) and the type of operation by the player (operation type) as the player operation. Operation positions may include, with the operation detection unit TP divided into three in the X direction, a first position P1, which is a left-side (−X side) operation position, a second position P2, which is a center operation position, and a third position P3, which is a right-side (+X side) operation position. The operation types may include, but are not limited to, include a "touch," in which there is release within a predetermined time after the player touches the operation detection unit TP, and a "flick," in which there is a movement by the player on the surface of the operation detection unit TP while remaining in contact therewith. Flicks may include, but not limited to, flicks in which the movement by the player on the surface of the operation detection unit TP is in various directions. There is a left flick, a right flick, an up flick, and a down flick. As long as the operation detection unit TP can detect the operation position and operation type of the player operation, the touch sensor can be replaced by an operation button. The detailed configuration of the terminal 100 will next be described, with references made to FIG. 3.

Figure 3:
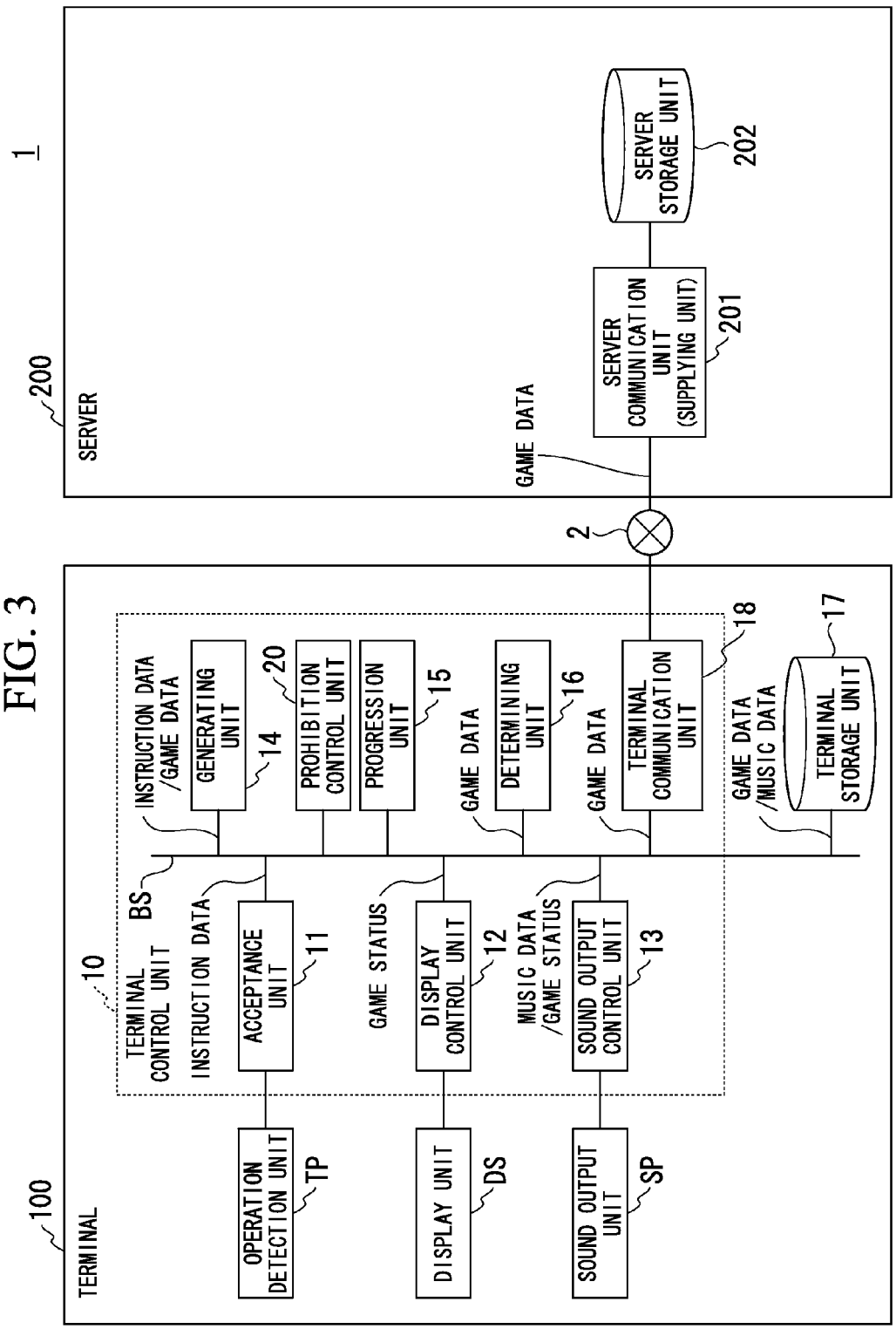
FIG. 3 is a diagram illustrating an example of internal configurations of a server and a terminal included in the game system of the first embodiment of the present invention.

FIG. 3 shows an example of the configuration of the game system 1 according to this embodiment. As shown in this drawing, the server 200 may include, but is not limited to, a server communication unit 201 and a server storage unit 202. The server storage unit 202 may be configured to store game data that is to be supplied to the terminal 100.

The server communication unit 201 may be configured to communicate with a terminal communication unit 18 of the terminal 100. The server communication unit 201 may be configured to read game data from the server storage unit 202 and to transmit the read-out game data to the terminal communication unit 18 of the terminal 100. The server communication unit 201 may be configured to receive game data transmitted from the terminal communication unit 18 of the terminal 100 and to write the received game data into the server storage unit 202.

In addition to the display unit DS, the operation detection unit TP, and the sound output unit SP, the terminal 100 may further include, but is not limited to, a terminal control unit 10, and a terminal storage unit 17 (storage unit). The terminal control unit 10 may further include, but is not limited to, an acceptance unit 11, a display control unit 12, a sound output control unit 13, a generating unit 14, a progression unit 15, a determining unit 16, a terminal communication unit 18, and a prohibition control unit 20. Each of these units is connected via one or more buses BS so as to allow those units to exchange data.

The acceptance unit 11 may be configured to accept information that indicates a player operation detected by the operation detection unit TP. The acceptance unit 11 may be configured to generate, based on the accepted information indicating the player operation, instruction data (instruction information) that is information indicating the player instruction. In this case, the term "instruction data" may include at least information that indicates the operation position, information that indicates the operation type, and information that indicates the timing of the operation by the player (operation timing), these types of information being mutually associated. The term "operation timing" refers to the timing of acceptance by the acceptance unit 11 of information that indicates a player operation. The acceptance unit 11 may be configured to acquire the followings, from the operation detection unit TP, when the operation detection unit TP detects a player operation. For example, the acceptance unit 11 may be configured to acquire, as information indicating the operation, the information that indicates the operation position and operation type of the detected operation, and to acquire the amount of time elapsed from the starting time of the game from a non-illustrated timer that starts keeping time at the starting time of the game. The acceptance unit 11 may be configured to generate, based on the acquired operation position, operation type, and elapsed time, information indicating the operation position, information indicating the operation type, and information indicating the operating timing, mutually associates these types of generated information, and to generate instruction data.

The terminal storage unit 17 (storage unit) stores game data. The game data stored by the terminal storage unit 17 will be described with references made to FIG. 4.

Figures 4, 5:
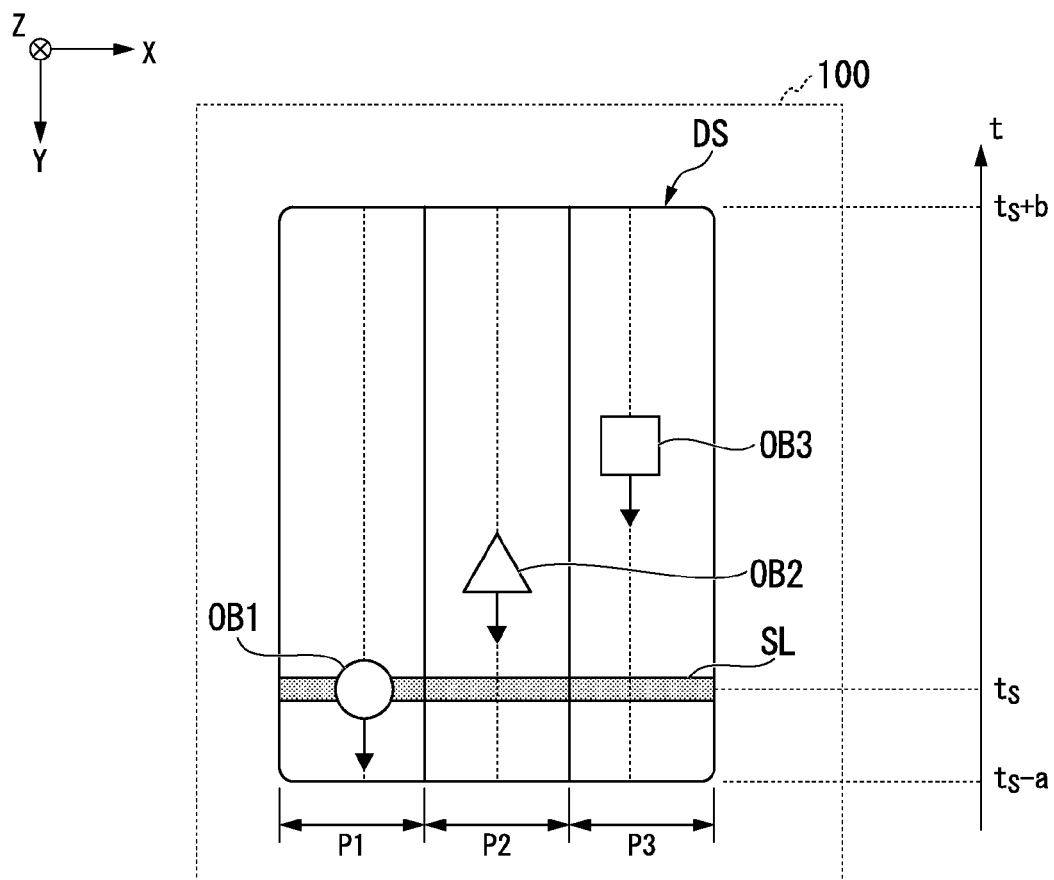
FIG. 4 is a table showing gate data to be stored in a storage unit in the terminal of the first embodiment of the present invention.
FIG. 5 is a view showing an example of a game image involved in a game through which the progression unit progresses of the first embodiment of the present invention.

FIG. 4 shows an example of game data stored by the terminal storage unit 17 in the present embodiment.

The game data stored by the terminal storage unit 17 may typically be the mutually associated data of "Time" that indicates the operation timing, "Position" that indicates the operation position, and "Type" that indicates the operation type. As one example, the terminal storage unit 17 may store "7", "P1" and "○" (circle) in association with each other. "7" represents that the operating timing is 7 seconds after the start of the game. "P1" represents the first operation position P1. "○" (circle) represents the operation type of "Tap". In the same manner, the terminal storage unit 17 may store "8", "P2" and "Δ" (circle) in association with each other. "8" represents that the operating timing is 8 seconds after the start of the game. "P2" represents the second position "P2". "Δ" (triangle) represents the operation type of "up flick." Also, the terminal storage unit 17 stores "9", "P3" and "□" (square) in association with each other. "9" represents that the operating timing is 9 seconds after the start of the game. "P3" represents the third position "P3". "□" (square) to indicate the operation type of "left flick." The terminal storage unit 17 also stores music data for the purpose of playing background music during a game.

Returning to FIG. 3, the configuration of the terminal control unit 10 will be described.

The display control unit 12 may be configured to supply, to the display unit DS, an image signal of an image that indicates the status of a game that is being progressed through by the progression unit 15. The display control unit 12 may be configured to acquire, from the progression unit 15, via the bus BS, information that indicates the status of the game being progressed through by the progression unit 15. Next, the display control unit 12 may be configured to generate, based on the acquired information indicating the status of the game, an image signal that indicates the game status, and to supply the generated image signal to the display unit DS. An example of a game that is progressed through by the progression unit 15 will be described later, with references made to FIG. 5.

The sound output control unit 13 may be configured to supply, responsive to the status of the game being progressed through by the progression unit 15, a sound signal to the sound output unit SP. The sound output control unit 13 may be configured to acquire, via the bus BS, music data stored by the terminal storage unit 17. The sound output control unit 13 may be configured to generate a sound signal based on the acquired music data. Next, the sound output control unit 13 may be configured to supply the generated sound signal to the sound output unit SP.

The generating unit 14 may be configured to generate, based on the instruction data generated by the acceptance unit 11, game data used in the progression of the game. The generating unit 14 may be configured to generate game data to be used in the progression of the game, based on instruction data indicating the instruction of a player input to the terminal 100-1 (first terminal) of the plurality of terminals 100. The generating unit 14 may be configured to acquire instruction data generated by the acceptance unit 11, via the bus BS. The generating unit 14 may be configured to acquire each of the information indicating the operation position, the information indicating the operation type, and the information indicating the operation timing, which are included in the acquired instruction data, and to write them into the terminal storage unit 17, via the bus BS. The generating unit 14 may be configured to generate game data in this manner. In this case, these game data may include information (denial of permission for use information) that indicates whether or not transmission of game data to the server 200 is to be prohibited. This game data may include information that indicates the permission (or denial of permission) to upload game data to the server 200. When generating the game data, the generating unit 14 sets a value into the game data that denies permission to upload game data to the server 200 as the initial value of the denial of permission for use information.

The progression unit 15 may be configured to use the game data stored in the terminal storage unit 17 to make the game progression, based on the instruction data generated by the acceptance unit 11. The progression unit 15 may be configured to use the game data generated by the generating unit 14 to progress through the game. An example of an image of a game through which the progression unit 15 is progressing will be described, making references to FIG. 5.

FIG. 5 shows an example of an image of a game through which the progression unit 15 is caused to progress in the present embodiment. This game is one in which there is a competition for score as the calculation of the degree of coincidence between operation instructions indicated by objects OB that move in the (+Y) direction on the display unit DS to match music output by the sound output unit SP and the operations by a player.

In this case, the objects OB are images that indicate the operation instructions of the operation position, the operation type, and the operation timing of a player operation. As one example, the object OB1 is a ○ (circle) image as an operation instruction indicating a tap. In the same manner, the object OB2 is a Δ (triangle) image as an operation instruction indicating a up flick, and the object OB3 is a □ (square) image as an operation instruction indicating a left flick. The object OB1 is displayed at the first position P1, of the three operation positions that divide the operation detection unit TP into three in the X direction. In the same manner, the object OB2 is displayed at the second position P2, and the object OB3 is displayed at the third position P3. In the following, unless there is a distinction made between objects OB1 to OB3, they will be collectively referred to as the objects OB.

The images of the objects OB appears at the top edge (−Y side edge) of the display unit DS and, as time elapses, moves in the (+Y) direction, crossing the reference line SL, and disappearing at the bottom edge (+Y side edge) of the display unit DS. When this occurs, the speed of movement in the (+Y) direction on the display unit DS (for example number of pixels of movement per unit time) is such that the time from the appearance of an object OB image at the top edge (−Y side edge) of the display unit DS until it disappears at the bottom edge (+Y side edge) of the display unit DS is the time (a+b). In this case, time a is the time from the time the object OB image reaches the reference line SL until it disappears at the bottom edge (+Y side edge) of the display unit DS, and the time b is the time from the time the object OB image appears at the top edge (−Y side edge) of the display unit DS until it reaches the reference line SL. These times a and b are, for example, set beforehand, based on the tempo of the music output by the sound output unit SP during the game.

A player who plays a game performs an operation with respect the operation detection unit TP so that the timing of an object image OB moving in the (+Y) direction crossing the reference line SL coincides with the timing of the operation. Also, the player who plays the game performs an operation with respect the operation detection unit TP so that the position at which the object OB image is displayed coincides with the position of the operation. Also, the player who plays the game performs an operation with respect to the operation detection unit TP so that the operation type indicated by the object OB image coincides with and the type of operation (for example, tap, up flock, and left flick). That is, the player playing this game performs an operation that coincides in operation position, operation type, and operation timing with the operation instruction indicated by the object OB image. In this game, the greater the degree of coincidence is between the operation instruction indicated by the object OB and the operation made by the player, the higher is the calculated score. As one example, when neither the type nor the position of an operation by a player coincide with the operation position and the operation type of the operation instructions indicated by the images of the objects OB, the score is calculated as 0 point ("miss"). In contrast, however, if of the operation instructions indicated by the object OB image, the operation position and the operation type coincide with the operation position and the operation type of the players operation, the score is further calculated based on the operation timing. The score is calculated based on the offset between the timing of the object OB image crossing the reference line SL (reference timing) and the timing of the player operation (instruction timing). For example, if the timing difference is within 0.2 second, the score may be calculated as 3 points ("perfect"), if the timing difference is within 0.4 second, the score may be calculated as 2 points ("great"), and if the timing difference is within 0.6 second, the score may be calculated as 1 point ("good").

Next, the configuration of the progression unit 15 that makes the game progression will be described. The progression unit 15 may be configured to make a determination regarding the coincidence of an operation instruction by an object OB that is displayed on the display unit DS and the instruction data generated by the acceptance unit 11. The progression unit 15 may be configured to generate, based on the determined degree of coincidence, generate the game playing results. The progression unit 15 may be configured to read the time sequence the game data stored in the terminal storage unit 17. The progression unit 15 may be configured to set, based on each of the "Position" and "Type" information included in the read-out data, information indicating the object OB display position (display position information) and object OB image information indicating the operation type as the operation instructions. The progression unit 15 may be configured to generate the set display position information and object OB image information as information that indicates the game status. The progression unit 15 may be configured to supply the generated information indicating the game status to the display control unit 12, via the bus BS. When this is done, the progression unit 15 may be configured to sequentially generate information indicating the game status so that, with the elapse of time "t", the position of the object OB in the Y-axis direction as displayed on the display unit DS moves in the (+Y) direction. The display control unit 12 may be configured to acquire the information indicating the game status from the progression unit 15, via the bus BS. The display control unit 12 may be configured to generate an image signal and supply the generated image signal to the display unit DS, wherein the generation of the image signal is made based on the display position information and object OB image information included in the acquired information indicating the game status. The display unit DS may be configured to display the image of the object OB, based on the image signal that has been generated by the display control unit 12.

The progression unit 15 may be configured to read the value of a timer that keeps the elapsed time after the start of the game. The progression unit 15 may be configured to calculate time (Ts+b), which is time "b" in the future from the time "Ts" indicated by the value of the read timer. Next, the progression unit 15 may be configured to read the "Position" and the "Type" stored by the terminal storage unit 17 in association with the "Time" that coincides with the calculated time (Ts+b). Next, the progression unit 15 generates information that indicates the game status, so that an image of an object OB of a type responsive to the read-out Type appears at the top edge (−Y side edge) of the display unit DS at one of the positions among the operation positions "P1" to "P3" that is responsive to the read-out "Position". Then, the progression unit 15 may be configured to sequentially generate information indicating the game status so that the object OB image crosses the reference line SL at a timing at which the timer value indicates the time (Ts+b). By doing this, the display unit DS may be configured to display the object OB image moving in the (+Y) direction with the elapse of time and also crossing the reference line SL at a timing when the timer value indicates the time (Ts+b).

The progression unit 15 may be configured to acquire instruction data generated by the acceptance unit 11. The progression unit 15 may be configured to calculate the score, based on the degree of coincidence between the acquired instruction data and the operation instruction indicated by the object OB image, and to generate information that indicates the playing results of the game, including the calculated score.

In a game in which a plurality of object OB images could be displayed at a plurality or display positions at the same time, the progression unit 15 may be configured to calculate the score for each of the plurality of objects OB. The progression unit 15 may be configured to write the generated information indicating the playing results into the terminal storage unit 17.

FIG. 6 shows an example of information indicating the playing results that are stored by the terminal storage unit 17 of the present embodiment. As shown in this drawing, the progression unit 15 may be configured to associate the calculated score and the "Position" that indicates the operation position with the operation timing and to store these items in the terminal storage unit 17.

Returning to FIG. 3, the configuration of the terminal control unit 10 will be described.

The determining unit 16 may be configured to make, based on the results of progression by the progression unit 15 through the game data generated by the generating unit 14, a determination regarding whether or not to prohibit uploading of the game data to the server 200. The determining unit 16 may be configured to make a determination regarding prohibiting the use of the game data by terminals 100 by other than at least the terminal 100-1 (first terminal), wherein the determination is made based on the playing results from one or a plurality of plays by the player of a game through which the progression unit 15 progresses, using the game data generated by the generating unit 14 based on instruction data indicating the player instruction.

The determining unit 16 may be configured to read the game data generated by the generating unit 14 from the terminal storage unit 17, via the bus BS, and to supply the read-out game data to the progression unit 15. Next, the determining unit 16 may be configured to read from the terminal storage unit 17 the playing results written by the progression unit 15 into the terminal storage unit 17 as the playing results of the game through which the progression unit 15 progresses based on the supplied game data. The determining unit 16 may be configured to compare the score included in the read-out playing results with a predetermined score threshold score value. The determining unit 16 may be configured to determine that the game data generated by the generating unit 14 is valid game data and that use of the game data is to be permitted if the result of the comparison is that the score included in the playing results exceeds the score threshold value. The determining unit 16 may be configured to determine that the game data generated by the generating unit 14 is invalid game data, and that the use of the game data is to be prohibited if, however, the result of the comparison is that the score included in the playing results is at or below the score threshold value. When the proportion of objects OB for which the determination is "perfect" or "great," is, for example, below 87%, the determination is made to prohibit use of the game data. Then, the determining unit 16 may be configured to make the determination result be game data denial of permission for use information, and writes this into the terminal storage unit 17, via the bus BS.

The prohibition control unit 20 (control unit) may be configured to control, based on the determination result by the determining unit 16, the prohibition of the use of the game data. The prohibition control unit 20 may be configured to read the game data from the terminal storage unit 17, via the bus BS. The prohibition control unit 20 may be configured to determine whether or not use of the game data is prohibited, based on the denial of permission for use information included in the game data. Then, if the determination result is that the use of the game data is not prohibited, the prohibition unit 20 supplies the game data to the terminal communication unit 18, via the bus BS. If, however, the determination result is that the use of the game data is prohibited, the prohibition unit 20 does not supply the game data to the terminal communication unit 18.

The terminal communication unit 18 may be configured to communicate with the server communication unit 201, via the network 2. The terminal communication unit 18 may be configured to transmit (upload) the game data supplied from the prohibition control unit 20 to the sever communication unit 201, via the network 2.

(Game Play Mode Operation)

Figure 8:
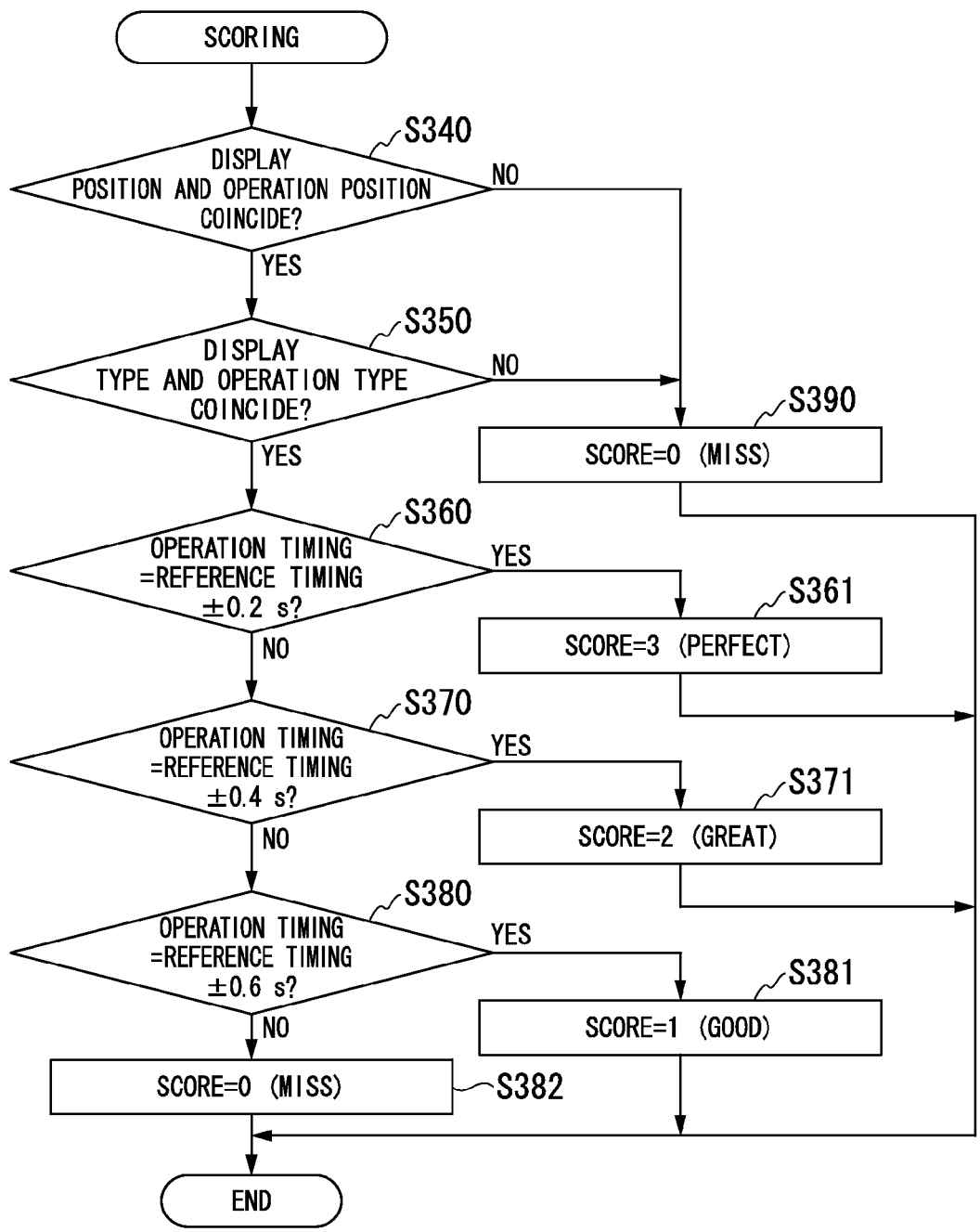
FIG. 8 is a flowchart showing an example of game operation of the scoring procedure of the first embodiment of the present invention.

Next, operation of the game system 1 in the game play mode will be described, with references made to FIG. 7 and FIG. 8. FIG. 7 is a flowchart that shows an example of the operation of the game system 1 of the present embodiment in the game play mode.

First, the acceptance unit 11, based on information that indicates an operation of starting the game play mode that is output by the operation detection unit TP, generates instruction data that indicates the start of the game play mode (game start) as information indicating the player instruction (step S10). Next, the acceptance unit 11 outputs the generated instruction data that indicates the start of the game play mode to the progression unit 15, via the bus BS.

Next, the progression unit 15, based on the instruction data that indicates the start of the game play mode acquired from the acceptance unit 11 via the bus BS, reads game data and music data from the terminal storage unit 17 (step S20). In this case, game data generated by the player, and game data downloaded via the terminal communication unit 18, the network 2 and the server communication unit 201 from the server storage unit 202 are stored beforehand in the terminal storage unit 17. The terminal storage unit 17 also stores music data beforehand.

Next, the progression unit 15 reads the music data from the terminal storage unit 17 via the bus BS, and supplies the read-out music data to the sound output control unit 13, via the bus BS. The progression unit 15 also starts the timer that keeps the elapsed game time (step S30).

Next, the acceptance unit 11 accepts information that indicates a player operation that is detected by the operation detection unit TP and, based on the information indicating the accepted player operation, generates instruction data that indicates the player instruction (step S40).

Next, the progression unit 15 acquires instruction data, generated by the acceptance unit 11 that indicates the player instruction from the acceptance unit 11, via the bus BS (step S50).

Next, the progression unit 15, based on the acquired instruction data, and in accordance with the scoring procedure to be described later, performs scoring (step S60). The progression unit 15 writes the score calculated based on the scoring procedure as the playing results information into the terminal storage unit 17, via the bus BS.

Next, the progression unit 15 determines whether or not the background music has ended (step S70). The progression unit 15 determines whether or not all the music data stored in the terminal storage unit 17 has been output as music. If the result is that the progression unit 15 determines that the background music has ended (YES at step S70), the processing proceeds to step S80. If, however, the progression unit 15 determines that not all of the game data stored in the terminal storage unit 17 has been read out, that is, that the background music has not ended (NO at step S70), processing proceeds to step S72.

At step S70, if the determination is made that the game has not ended, the progression unit 15 acquires the value of the timer that keeps the elapsed game time, and calculates the time (Ts+b) that is the time b in the future from the time Ts indicated by the acquired timer value. Next, the progression unit 15 searches among the game data stored by the terminal storage unit 17 for a time Time that coincides with the calculated time (Ts+b). Next, if a Time that coincides with the calculated time (Ts+b) exists, the progression unit 15 reads the Position and Type associated with that Time. Next, the progression unit 15 generates information that indicates the game status, so that an image of an object OB of a type responsive to the read-out Type appears at the top edge (−Y side edge) of the display unit DS at one of the positions among the operation positions P1 to P3 responsive to the read-out Position. If there is already an object OB displayed on the display unit DS, the progression unit 15 moves the display position of the object OB image in the (+Y) direction by a predetermined number of pixels and generates information that indicates the game status. Next, the progression unit 15 outputs the generated information that indicates the game status to the display control unit 12, via the bus BS, and processing returns to step S40 (step S72).

If, however, the determination is made at step S70 that the game has ended, the progression unit 15 reads the playing results information from the terminal storage unit 17, via the bus BS, and outputs the read-out playing results information to the display control unit 12, via the bus BS. The display control unit 12, generates an image signal of the playing results image, based on the playing results information acquired from the progression unit 15. The display unit DS, based on the image signal generated by the display control unit 12, displays the playing results image (step S80), and processing ends. The above describes the progress procedure and progression steps from step S10 to step S80.

Next, the scoring procedure by the progression unit 15 will be described, with references made to FIG. 8. FIG. 8 is a flowchart that shows an example of the operation of the scoring procedure in the present embodiment.

First, the progression unit 15 determines whether or not the player operation type accepted by the acceptance unit 11 at step S40 and the operation type (display type) indicated by an image of the object OB coincide (step S350). If the progression unit 15 determines that the player operation type and the object OB display type coincide (YES at step S350), processing proceeds to step S360. If, however, the progression unit 15 determines that the player operation and the object OB display type do not coincide (NO at step S350), processing proceeds to step S390.

Next, the progression unit 15 determines whether or not the difference between the player operation timing accepted by the acceptance unit 11 at step S40 and the timing of the object OB image crossing the reference line SL (reference timing) is within ±0.2 second (step S360). If the progression unit 15 determines that the difference between the player operation timing and the reference timing is within ±0.2 second (YES at step S360), then processing proceeds to step S361. If, however, the progression unit 15 determines that the difference between the player operation timing and the reference timing is not within ±0.2 second (NO at step S360), then processing proceeds to step S370.

Next, if the determination is made at step S360 that the difference between the player operation timing and the reference timing is within ±0.2 second, the progression unit 15 calculates the score as 3 points ("perfect"), and ends the scoring procedure (step S361).

The progression unit 15 also determines whether or not the difference between the player operation timing accepted by the acceptance unit 11 at step S40 and the timing of the object OB image crossing the reference line SL (reference timing) is within ±0.4 second (step S370). If the progression unit 15 determines that the difference between the player operation timing and the reference timing is within ±0.4 second (YES at step S370), then processing proceeds to step S371. If, however, the progression unit 15 determines that the difference between the player operation timing and the reference timing is not within ±0.4 second (NO at step S370), then processing proceeds to step S380).

Next, if the determination is made at step S370 that the difference between the player operation timing and the reference timing is within ±0.4 second, the progression unit 15 calculates the score as 2 points ("great"), and ends the scoring procedure (step S371).

The progression unit 15 also determines whether or not the difference between the player operation timing accepted by the acceptance unit 11 at step S40 and the timing of the object OB image crossing the reference line SL (reference timing) is within ±0.6 second (step S380). If the progression unit 15 determines that the difference between the player operation timing and the reference timing is within ±0.6 (YES at step S380), processing proceeds to step S381. If, however, the progression unit 15 determines that the difference between the player operation timing and the reference timing is not within ±0.6 second (NO at step S380), then processing proceeds to step S382).

Next, if the determination is made at step S380 that the difference between the player operation timing and the reference timing is within ±0.6 second, the progression unit 15 calculates the score as 1 point ("good") and ends the scoring procedure (step S381).

If, however, the determination is made at step S380 that the difference between the player operation timing and the reference timing is not within ±0.6 second, the progression unit 15 calculates the score as 0 points ("miss") and ends the scoring procedure (step S382).

(Edit Mode Operation)

Figure 9:
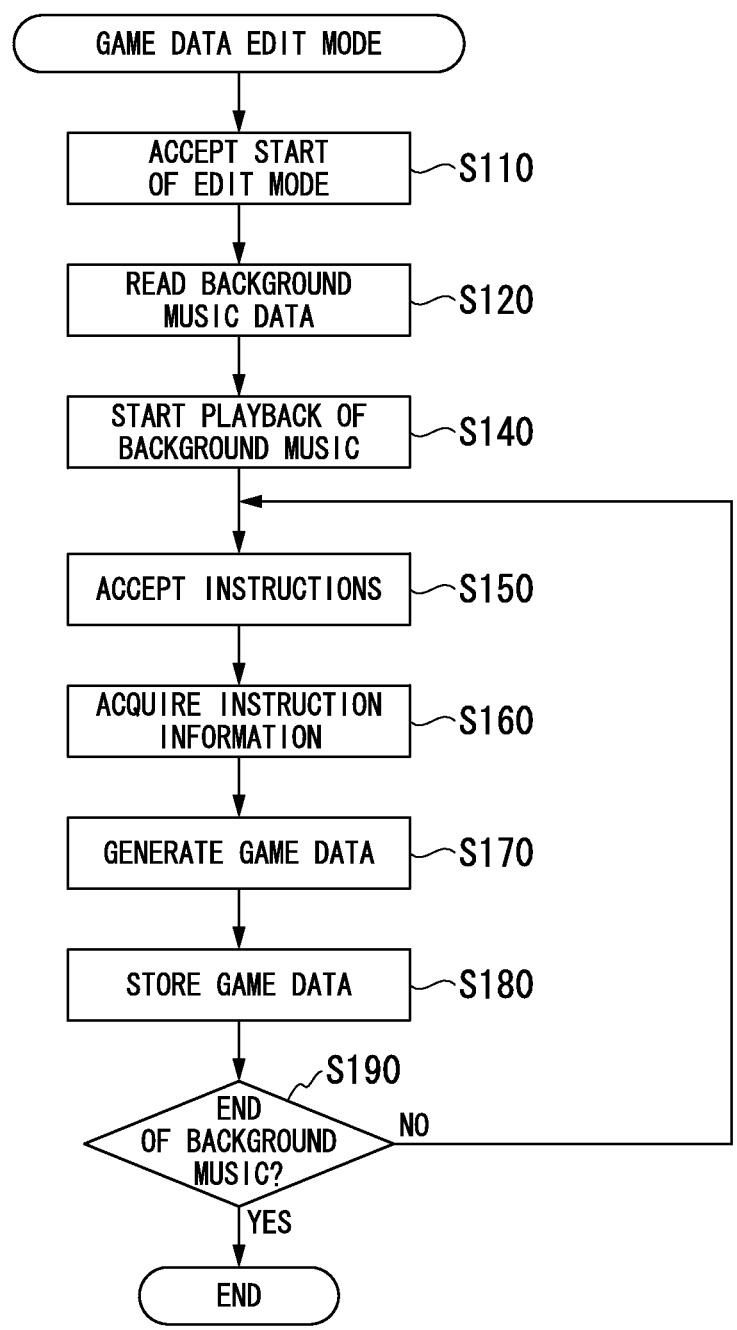
FIG. 9 is a flowchart showing an example of game operation in an edit mode of the game system of the first embodiment of the present invention.

Referring to FIG. 9, the operation of the game system 1 in the edit mode will be described. FIG. 9 is a flowchart that shows an example of the operation in the edit mode of the game system 1 of the present embodiment.

First, the acceptance unit 11 accepts information that indicates the operation of the start of the edit mode as information indicating a player operation that is detected by the operation detection unit TP and, based on the information indicating the operation of the start of the edit mode, generates instruction data that indicates the start of the edit mode (step S110). The acceptance unit 11 outputs the generated instruction data that indicates the start of the edit mode to the progression unit 15, via the bus BS.

Next, the progression unit 15, based on the instruction data indicating the start of the edit mode acquired from the acceptance unit 11 via the bus BS, reads music data from the terminal storage unit 17 (step S120). In this case, music data has been stored in the terminal storage unit 17 beforehand.

Next, the progression unit 15 reads music data from the terminal storage unit 17, via the bus BS, and supplies the read music data to the sound output control unit 13, via the bus BS. The progression unit 15 also starts the timekeeping of the timer that keeps the elapsed game time (step S140).

Next, the acceptance unit 11 accepts information that indicates a player operation detected by the operation detection unit TP and, based on the accepted information indicating the player operation, generates instruction data (step S150).

Next, the generating unit 14 acquires the instruction data generated by the acceptance unit 11 from the acceptance unit 11, via the bus BS (step S160).

Next, the generating unit 14 acquires the value of the timer that keeps the elapsed game time. Next, the generating unit 14 associates the acquired time Ts and the information indicating the operation position and the information indicating the operation type that are included in the instruction data acquired at step S160 and generates game data (step S170) (generating procedure, generating step).

Next, the generating unit 14 writes the generated game data into the terminal storage unit 17 (step S180).

Next, the progression unit 15 determines whether or not the background music has ended (step S190). The progression unit 15 determines whether or not all the music data stored in the terminal storage unit 17 has been output as sound. If the progression unit 15 determines that the background music has ended (YES at step S190), it ends processing. If however, the progression unit 15 determines that the background music has not ended (NO at step S190), processing returns to step S150.

As described above, the game system 1 of the present embodiment may include, but is not limited to, the generating unit 14, the progression unit 15, the determining unit 16, and the prohibition control unit 20 (control unit). The generating unit 14 generates game data used in the game progression, based on the instruction data that indicates the player instructions input to the terminal 100-1 (first terminal) of the plurality of terminals 100. The progression unit 15 progresses through the game, using the game data generated by the generating unit 14. Based on the playing results from one or a plurality of plays by the player of a game through with the progression unit 15 progresses, using the game data generated by the generating unit 14 based on instruction data that indicates the player instruction, the determining unit 16 makes a determination regarding prohibiting the use of the game data. In this case, the determining unit 16 makes a determination regarding prohibiting use of the game data by terminals 100 by other than at least the terminal 100-1 among a plurality of terminals 100. Also, the prohibition control unit 20 controls prohibition of use of the game data based on the results determined by the determining unit 16.

At this point, the game system 1 causes the other terminals 100 to use the game data that has been generated by the terminal 100-1 (first terminal) based on a player operation, via the server 200. In this case, the game data generated by the terminal 100 based on a player operation includes game data which is not appropriate for other terminals 100 to use. For example, the game data generated by the terminal 100 includes game data having an excessively high level of difficulty. If a player plays a game based on game data having such an excessively high level of difficulty, because of the excessively high level of difficulty, the player could feel dissatisfaction. Also, the game data generated by the terminal 100 includes game data with which a player would never be able to get through to the goal of the game, regardless of what operations have been made, that is, unclearable game data. If a player plays a game based on such unclearable game data, because it is impossible to reach the goal, the player could feel dissatisfaction.

When a player plays a game using game data that has a high level of difficulty, the playing results obtained are different from when playing a game using game data having a low level of difficulty. In the same manner, when a player plays a game using game data that is unclearable, the playing results obtained are different from when playing a game using clearable game data. Thus, the level of difficulty or the clearability of game data may be determined by the playing results of the game when played using the game data. For example, in the case of playing a game using game data having a high level of difficulty, playing results are obtained that have a score that is lower compared to the case of playing a game using game data having a low level of difficulty.

Given this, if a player who generates game data him/herself plays a game using this game data and may not obtain the desired playing results, the game system 1 prohibits use of this game data. That is, the game system 1, based on the playing results of a game, prohibits the uploading of the game data to the server 200 and storage thereof in the server 200, and the downloading thereof to a terminal 100 and use thereby to progress through a game. By doing this, the game system 1 can prohibit the use of game data that is generated by the player him/herself and that cannot obtain the desired playing results, that is, game data with an excessively high level of difficulty and unclearable game data. In contrast, it is possible to provide a game using game data with which it is possible for the player generating the game data to obtain the desired playing results, that is, game data that does not have an excessively high level of difficulty, and that is not unclearable game data. In this manner, the game system 1 can use the game data generated by a player to reduce the dissatisfaction of players playing a game.

The determining unit 16 of the game system 1 determines the prohibition of the uploading of game data generated by the generating unit 14 from the terminal 100-1 (first terminal) to the server 200 that can communicate with a plurality of terminals via a communication network as the prohibition of the use of the game data. That is, the server 200 of the game system 1 does not store game data that is prohibited from being used. By doing this, in the game system 1, compared with the case in which game data that is prohibited from being used is stored in the sever storage unit 202, it is possible to reduce the storage capacity of the server storage unit 202 that stores game data. Also, in the game system 1, because the uploading via the network 2 of game data that is prohibited from being used is prohibited, compared to the case in which the uploading of game data that is prohibited from being used is allowed, it is possible to reduce the communication load on the network 2.

If the playing results do not satisfy a given condition, the determining unit 16 of the game system 1 makes a determination to prohibit the use of the game data generated by the generating unit 14. That is, in the game system 1, if a player who has generated game data plays a game in accordance with the game data, and the playing results satisfy a predetermined condition, for example, reaching or exceeding a predetermined threshold value, it is possible to allow the uploading of the game data. By doing this, the game system 1 can prohibit the use of game data having an excessively high level of difficulty and unclearable game data. That is, the game system 1 can reduce the feeling of dissatisfaction on the part of a player using game data generated by the player.

The determining unit 16 of the game system 1, based on the difference between the operation timing indicated by the information included in the game data generated by the generating unit 14 and the operation timing of a player playing a game that is being progressed through by the progression unit 15 using the game data, makes a determination regarding the prohibition of use of the game data. By doing this, the game system 1 can prohibit a player who has generated game data from using game data in which the timing makes operation difficult.

Although the above description has been for a configuration in which the terminal 100 includes the determining unit 16 and the prohibition control unit 20, the server 200 may be configured to include a determining unit 205 (acquisition and determining unit) and a prohibition control unit 206 (acquisition and control unit). In this case, the determining unit 205 makes a determination regarding based on the results of determination of whether or not to acquire from the first terminal 100-1 game data that has been generated based on player's instruction information input to the first terminal 100-1, this being game data that has been determined to be prohibited from being used, based on one or more of the playing results by the player playing a game being progressed through using the game data. Also, the prohibition control unit 206, based on the determination result by the determination unit 205, controls the prohibition of acquisition of game data from the first terminal 100-1. With this configuration as well, it is possible for the game system 1 to prohibit the use of game data having an excessively high level of difficulty and game data that is unclearable. That is, the game system 1 can reduce the feeling of dissatisfaction on the part of player using game data generated by the player.

Second Embodiment

The second embodiment of the present invention will be described, with references made to the drawings. Elements of the configurations of or the units of the game system that are the same as ones in the above-described first embodiment are assigned the same reference numerals, and the descriptions thereof will be omitted.

Figure 10:
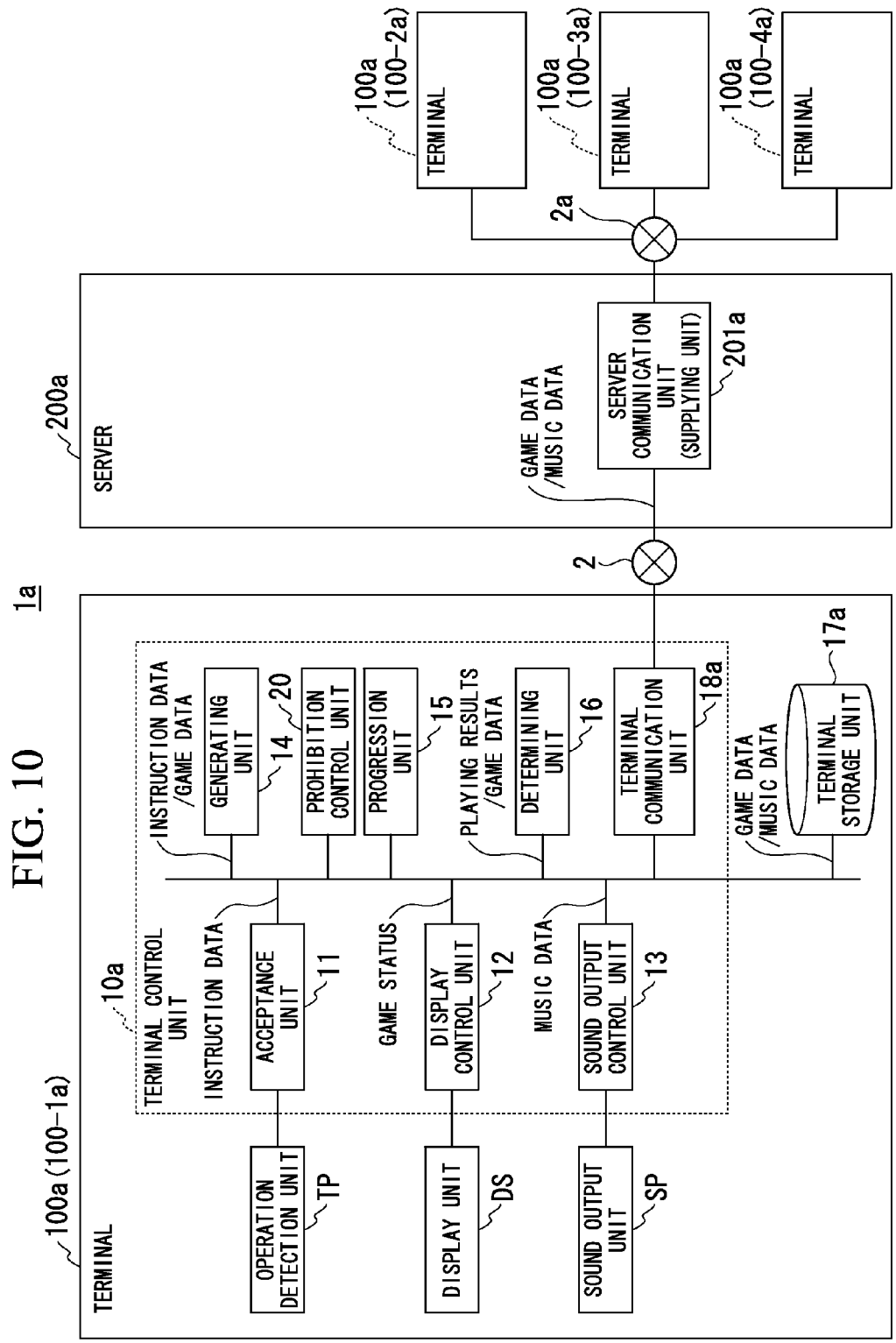
FIG. 10 is a diagram illustrating an example of internal configurations of a server and a terminal included in the game system of a second embodiment of the present invention.

FIG. 10 shows an example of the configuration of a game system 1a according to the second embodiment of the present invention. The game system 1a differs from the game system 1 in that the server 200a does not include a server storage unit 202. The game system 1a includes a terminal 100a and a server 200a. The server 200a includes a server communication unit 201a (supplying unit). The server communication unit 201a supplies game data that has been supplied from the terminal 100-1a (first terminal) to the other terminals 100a (terminals 100-2a to 100-4a).

The terminal 100a may include a terminal communication unit 18a in a terminal control unit 10a and a terminal storage unit 17a.

The terminal storage unit 17a may be configured to store game data that is generated by the generating unit 14 and music data.

The terminal communication unit 18a may be configured to supply game data that is stored by the terminal storage unit 17a to the other terminals 100a, via the network 2, the server 200a, and a network 2a.

As described above, the game system 1a may be configured to supply game data stored in the terminal storage unit 17a of the terminal 100a, in place of the server storage unit 202, to the other terminals 100a. With this configuration as well, the game system 1a can achieve the same effect as with the game system 1. The game system 1a may be configured to provide game data with which it is possible for the player generating the game data to obtain desired playing results, that is, game data that does not have an excessively high level of difficulty, and that is not unclearable game data. The game system 1a may be configured to prohibit the supplying to the other terminals 100a of game data with which a player who generated the game data cannot obtain the desired playing results, that is, game data having an excessively high level of difficulty or unclearable game data. Thus, the game system 1a may be configured to reduce the feeling of dissatisfaction on the part of a player using game data generated by the player.

As described above with regard to the first embodiment, the server 200a may include the determining unit 205 (acquisition and determining unit) and the prohibition control unit 206 (acquisition and control unit). With this configuration as well, the game system 1a may be configured to prohibit the use of game data having an excessively high level of difficulty and unclearable game data. The game system 1a may be configured to reduce the feeling of dissatisfaction on the part of a player playing using game data generated by the player.

Third Embodiment

The third embodiment of the present invention will be described, with references made to the drawings. Elements of the configurations of or the units of the game system that are the same as in the above-described embodiments are assigned the same reference numerals, and the descriptions thereof will be omitted.

Figure 11:
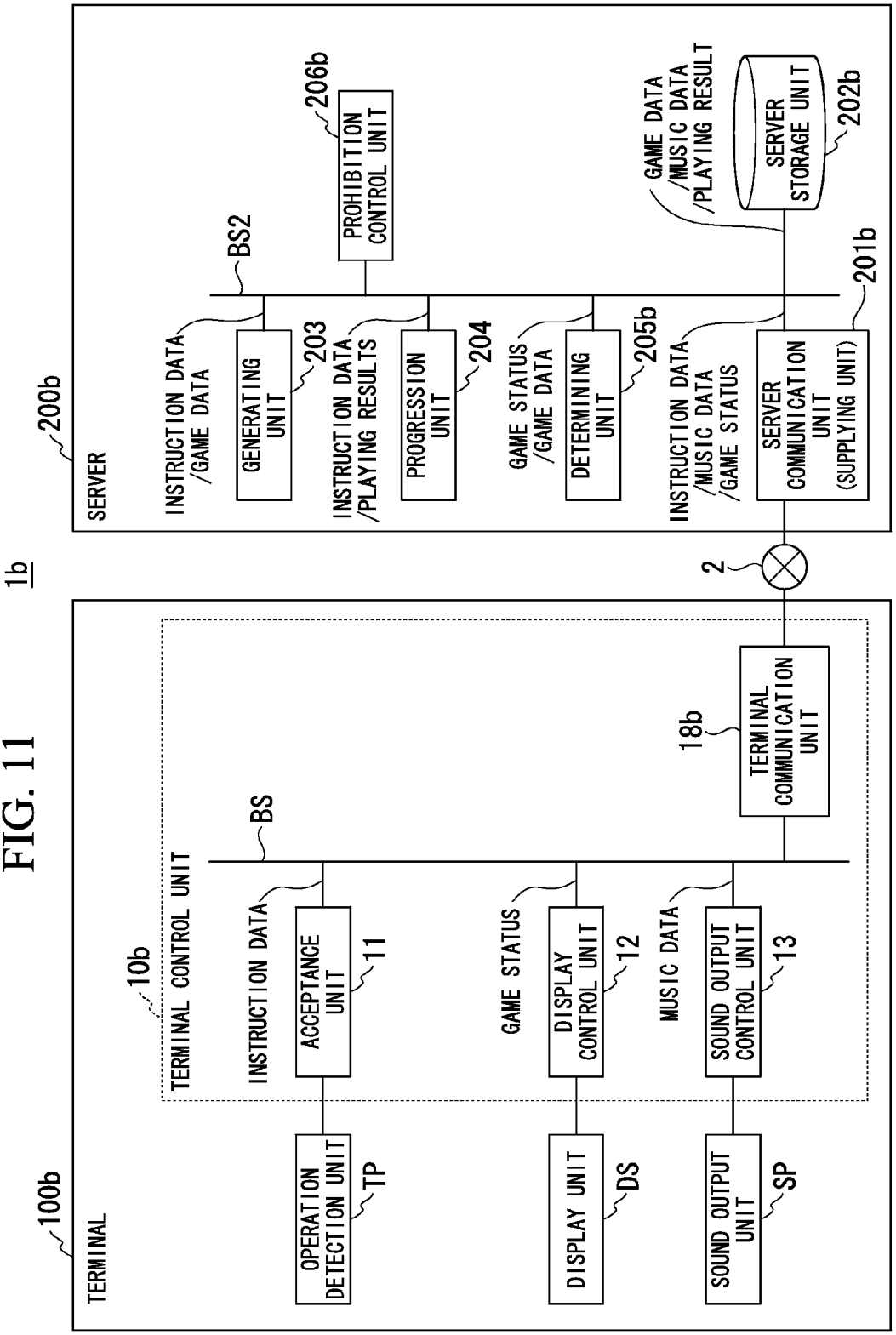
FIG. 11 is a diagram illustrating an example of internal configurations of a server and a terminal included in the game system of a third embodiment of the present invention.

FIG. 11 shows an example of the configuration of a game system 1b according to the third embodiment of the present invention. The game system 1b differs from the game system 1 in that a server 200b includes elements of the configurations of or the units of the game system that correspond to the terminal storage unit 17, the generating unit 14, the progression unit 15, the determining unit 16, and the prohibition control unit 20 of the terminal 100. The game system 1b includes a terminal 100b and the server 200b.

The terminal 100b includes a terminal communication unit 18b in a terminal control unit 10b. The terminal communication unit 18b communicates with a server communication unit 201b via the network 2. The terminal communication unit 18b transmits instruction data generated by the acceptance unit 11 to the server 200b, receives information that indicates the game status generated by the server 200b, and outputs information indicating the received game status to the display control unit 12.

The server 200b of the game system 1b includes a server communication unit 201b that communicates with the terminal communication unit 18b via the network 2. The server 200b also includes a server storage unit 202b (storage unit), a generating unit 203, a progression unit 204, a determining unit 205b, and a prohibition control unit 206b. The generating unit 203 is an element or a unit that corresponds to the generating unit 14. In the same manner, the progression unit 204, the determining unit 205, and the prohibition control unit 206b correspond, respectively, to the progression unit 15, the determining unit 16, and the prohibition control unit 20.

The server 200b is a server 200b that allows the use of acquired game data by terminals 100 of the plurality of terminals 100 other than at least the terminal 100-1b (first terminal) and that includes a determining unit 205b. The determining unit 205b makes a determination regarding whether or not to prohibit terminals 100b other than the terminal 100-1b from using game data that has been generated based on instruction data indicated by a player instruction input to the terminal 100-1b, which is game data that has been determined to be prohibited from being used, based on one or a plurality of playing results of the player playing and progressing through the game using the game data. The prohibition control unit 206b, based on the determination results by the determining unit 205b, controls the prohibition of use of the game data in the terminals 100b.

As described above, in the game system 1b, the server 200b includes elements of the configurations of or the units of the game system that correspond to the terminal storage unit 17, the generating unit 14, the progression unit 15, the determining unit 16, and the prohibition control unit 20 of the terminal 100 of the game system 1. With this configuration as well, the game system 1b may be configured to achieve the same effect as the game system 1. The game system 1b may be configured to provide to the other terminals 100b information that indicates the game status based on game data with which a player who has generated the game data can achieve the desired playing results, that is, information that indicates a game status that is based on game data that does not have an excessively high level of difficulty or that is not unclearable. The game system 1b may also be configured to prohibit the supply to the other terminals 100b of information that indicates a game status based on game data with which the player who has generated the game data cannot obtain the desired playing results, that is, based on game data having an excessively high level of difficulty or based on unclearable game data. That is, the game system 1b may be configured to reduce the dissatisfaction felt by a player using game data that the player generated.

The determining unit 205b may be configured to determine the prohibition of the use of game data by the prohibition of storage of game data generated by the generating unit 203 into the server storage unit 202b (storage unit). With this configuration as well, the game system 1b may be configured to prohibit the supply to the other terminals 100b of information indicating a game status based on game data having an excessively high level of difficulty or based on unclearable game data. The server 200b of the game system 1b does not store game data that is prohibited from being used. By doing this, the game system 1b may be configured to enables a reduction in the storage capacity of the server storage unit 202b that stores game data, compared to the case in which the server storage unit 202b stores game data that is prohibited from being used.

The determining unit 205b may be configured to determine the prohibition of the supply to the terminal 100b from the server 200b capable of communicating, via the terminal 100b and the network 2 (communication network), information indicating a game status based on a game data generated by the generating unit 203 as being the prohibition of use of the game data. With this configuration as well, the game system 1b may be configured to prohibit the supply to the other terminals 100b of game data having an excessively high level of difficulty and of unclearable game data.

The determining unit 205b may be configured to determine the prohibition of progress through a game by the processing unit 204 using game data generated by the generating unit 203 as being the prohibition of use of the game data. With this configuration as well, the game system 1b may be configured to prohibit the supply to the other terminal 100b of game data having an excessively high level of difficulty and of unclearable game data.

Fourth Embodiment

The fourth embodiment for implementing the present invention will be described, with references made to the drawings. Elements of the configurations of or the units of the game system that are the same as in the above-described embodiments are assigned the same reference numerals and the descriptions thereof will be omitted.

Figure 12:
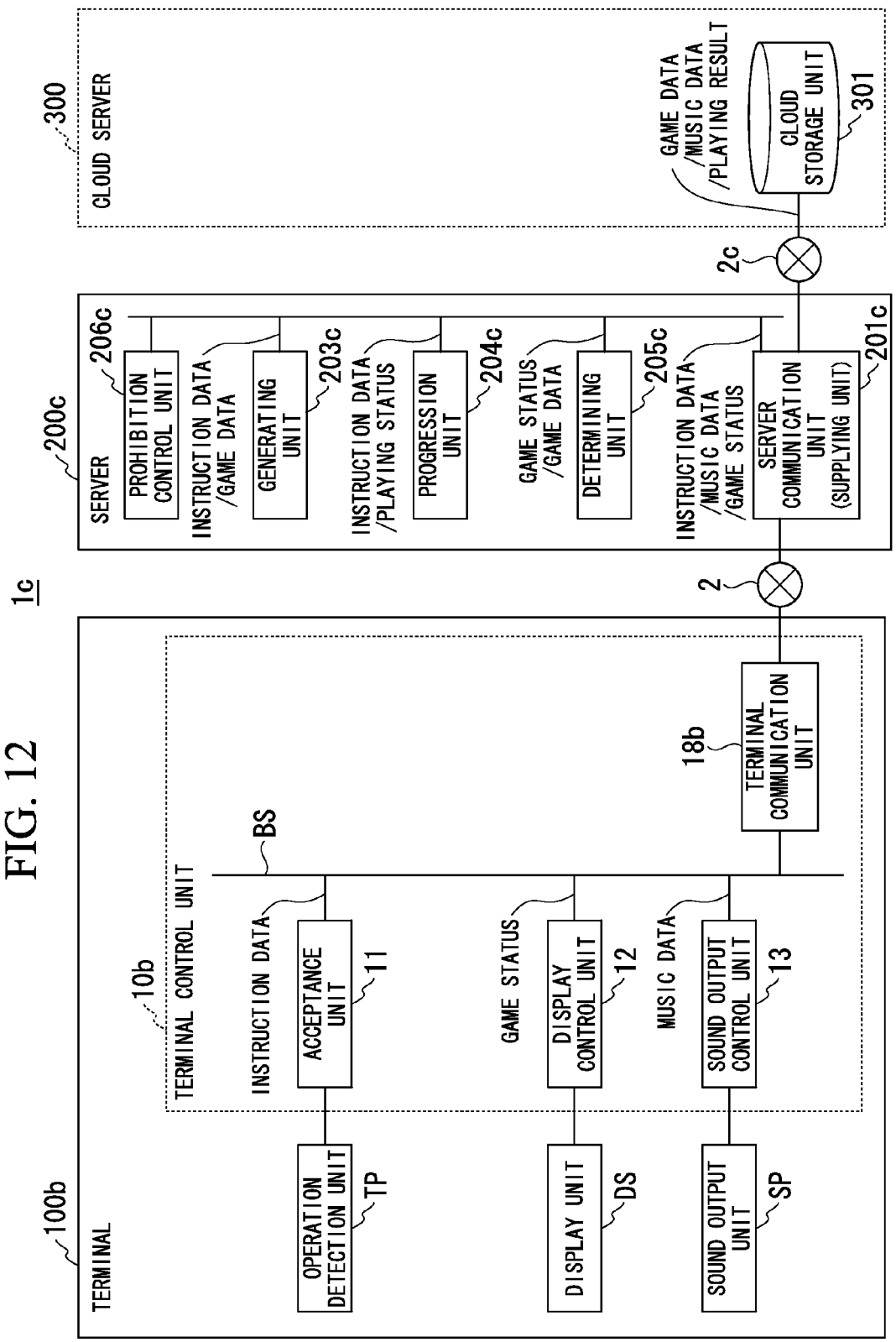
FIG. 12 is a diagram illustrating an example of internal configurations of a server and a terminal included in the game system of a fourth embodiment of the present invention.

FIG. 12 shows an example of the configuration of a game system 1c according to the fourth embodiment of the present invention. The game system 1c differs from the game system 1 with regard to a cloud server 300 having a cloud storage unit 301. The game system 1c has a server 200c and the cloud server 300. In the game system 1c, the server 200c and the cloud server 300 can communicate via a network 2c.

The server 200c includes a server communication unit 201c that communicates with the terminal 18b via the network 2. The server 200c also includes a generating unit 203c, a progression unit 204c, a determining unit 205c, and a prohibition control unit 206c. The generating unit 203c is an element or a unit that corresponds to the generating unit 14. In the same manner, the progression unit 204c, the determining unit 205c, and the prohibition control unit 206c are elements of the configurations of or the units of the game system that correspond, respectively, to the progression unit 15, the determining unit 16, and the prohibition control unit 20.

As described above, in the game system 1c, the cloud server 300 includes an element or a unit that corresponds to the terminal storage unit 17 (storage unit) of the terminal 100 of the game system 1. In the game system 1c, the server 200c also includes elements of the configurations of or the units of the game system that correspond to the generating unit 14, the progression unit 15, the determining unit 16, and the prohibition control unit 20 of the terminal 100 of the game system 1. With this configuration as well, the game system 1c may be configured to achieve the same effect as the game system 1. The game system 1c may be configured to provide to the other terminals 100c information that indicates the game status based on game data with which a player who has generated the game data can achieve the desired playing results, that is, based on game data that does not have an excessively high level of difficulty or that is unclearable. The game system 1c may also be configured to prohibit the supply to the other terminals 100c of information that indicates a game status based on game data with which the player who has generated the game data cannot obtain the desired playing results, that is, based on game data having an excessively high level of difficulty or on unclearable game data. That is, the game system 1c may be configured to reduce the dissatisfaction felt by a player using game data that the player generated.

Fifth Embodiment

Next, the fifth embodiment of the present invention will be described, with references made to the drawings. Elements of the configurations of or the units of the game system that are the same as in the above-described embodiments are assigned the same reference numerals, and the descriptions thereof will be omitted.

Figure 13:
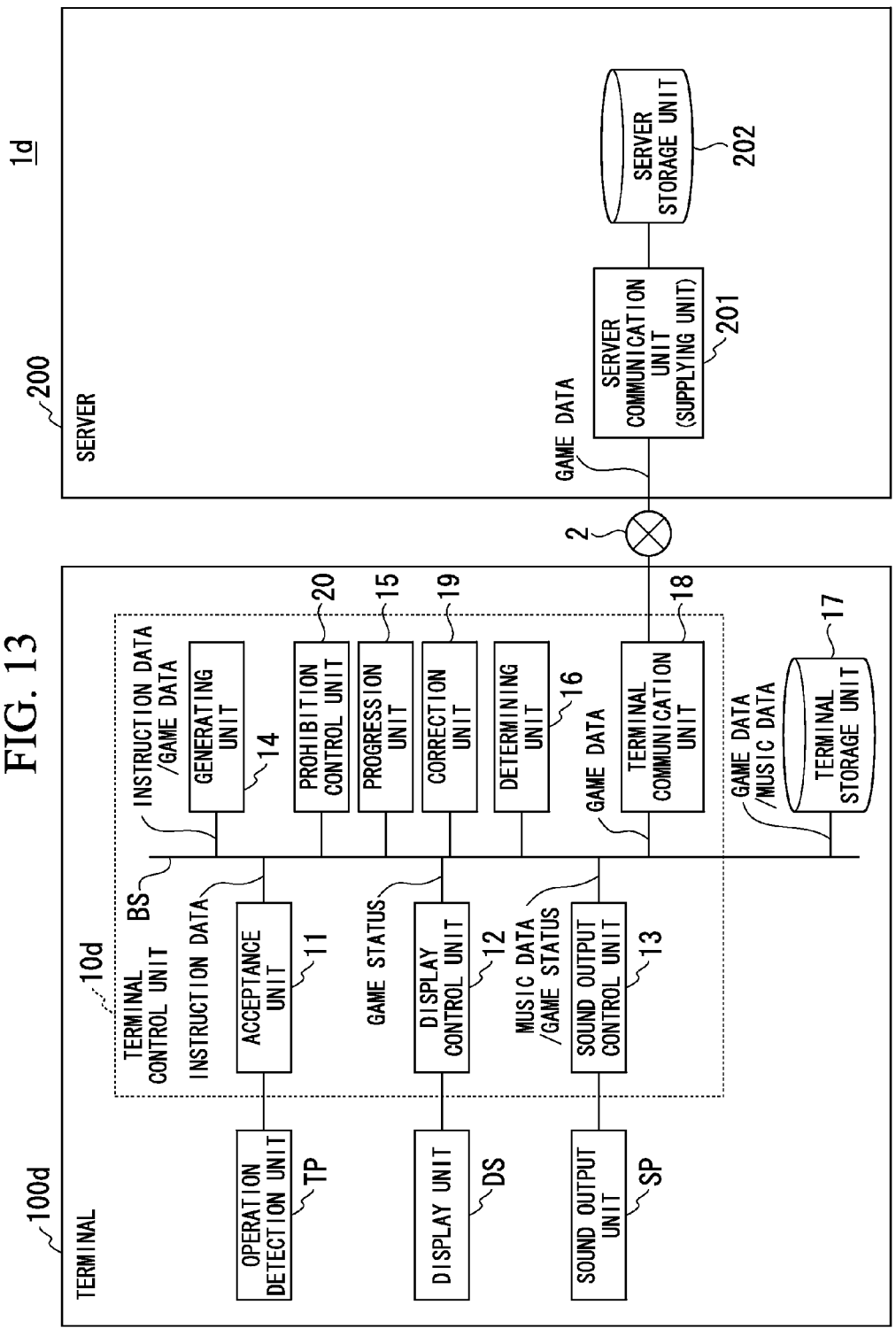
FIG. 13 is a diagram illustrating an example of internal configurations of a server and a terminal included in the game system of a fifth embodiment of the present invention.

FIG. 13 shows an example of the configuration of a game system 1d according to the fifth embodiment of the present invention. The game system 1d differs from the game system 1 with regard to a terminal 100d having a correction unit 19. The game system 1d has the terminal 100d. The terminal 100d has the correction unit 19 in a terminal control unit 10d.

The correction unit 19 corrects game data generated by the generating unit 14. The correction unit 19 corrects the game data based on one or a plurality of playing results by a player playing and progressing through a game by the progression unit 15 using game data that has been generated by the generating unit 14 based on instruction data that indicates player instructions.

The correction unit 19 corrects game data generated by the generating unit 14 in the following manner. First, in the edit mode, the generating unit 14, by the above-described configuration, generates game data and writes the generated game data into the terminal storage unit 17. In the game play mode, the progression unit 15, by the above-described configuration, reads the game data generated by the generating unit 14 from the terminal storage unit 17, and progresses through the game using the read-out game data. After that, at the end of the game, the progression unit 15 generates information that indicates the playing results of the game, and writes the generated information indicating the playing results into the terminal storage unit 17, associating it with the game data. At this point, the progression unit 15 may progress through the game a plurality of times using the read-out game data, in which case the progression unit 15 writes information that indicates the playing results each time a game is progress through, into the terminal storage unit 17, associating it with the game data.

The correction unit 19 reads, via the bus BS, the game data stored by the terminal storage unit 17 and the information associated with the game data that indicates the playing results. Next, the correction unit 19 corrects the game data based on the read-out information indicating the playing results. If the progression unit 15 progresses through a game a plurality of times and the terminal storage unit 17 stores a plurality of playing results, the correction unit 19 may read out information indicating the plurality of playing results.

Next, the correction unit 19 corrects the game data based on the read-out information indicating the playing results. As an example, the correction unit 19 performs a correction that deletes information that indicates a part of the objects OB included in the game data. Next, the correction unit 19 writes the corrected game data into the terminal storage unit 17, via the bus BS.

As described above, the game system 1*d* has a correction unit 19 that corrects game data, based on one or a plurality of playing results by a player progressing through the game by the progression unit 15 using the game data generated by the generating unit 14 based on instruction data indicated an instruction from the player. That is, the game system 1*d* can correct the generated game data, in accordance with the playing results from a game that is played with game data generated by a player him/herself. By doing this, the game system 1*d* can correct game data having an excessively high level of difficulty and unclearable game data generated by the player. For example, the game system 1*d*, of the objects OB included in the game data, determines that an object OB for which the progression unit 15 calculates the score as 0 points ("miss") is an object OB having an excessively high level of difficulty. Then, the game system 1*d* deletes a part of the objects OB included in the game data that has been determined as having an excessively high level of difficulty. The game system 1*d*, by determining the level of difficulty of an object OB in this manner, corrects game data having an excessively high level of difficulty and unclearable game data, enabling supply of corrected game data to the other terminals 100*d*. That is, the game system 1*d* is able to reduce the dissatisfaction felt by a player using game data generated by the player. The game system 1*d* may make a determination regarding the object OB having an excessively high level of difficulty based on playing results from a plurality of plays. By doing this, the game system 1*d* can improve the accuracy of determining an object OB having an excessively high level of difficulty, and can further reduce the dissatisfaction felt by a player using game data generated by the player.

The correction unit 19 may be configured to correct game data generated by the generating unit 14, based on one or the average of a plurality of playing results. With this configuration as well, it is possible to correct game data having a level of difficulty that is excessively high for the player who generated the game data and game data that is unclearable. Additionally, in order to correct game data based on the average of playing results, the game system 1*d* can supply to the other terminals 11*d* game data that has reduced variations between player operations.

When correcting the game data generated by the generating unit 14, the correction unit 19, based on one or a plurality of playing results, corrects the game data by changing information that indicates the timing of generation of instruction data as information indicating the timing of operations by a player, which is included in the game data generated by the generating unit 14. For example, in the edit mode, as player might make an operation with the wrong timing, in which case game data is generated that includes information indicating the wrong operation timing, not intended by the player. In this case, in the game play mode, the correction unit 19 acquires operation timing as the result of playing by the player him/herself, and corrects the game data based on the acquired operation timing. For example, when the player plays the game a plurality of times in the game play mode, the correction unit 19 takes the average value of the operation timing as the operation timing after correction, and corrects the game data. By correcting the game data in this manner, the game system 1*d* corrects game data generated by player operations with the wrong timing, and can supply corrected game data to the other terminals 100*d*.

The determining unit 16 may be configured to determine the prohibition of the use of game data based on one or a plurality of playing results of the game that is progressed through by the progression unit 15 using game data that is corrected by the correction unit 19. According to whether or not the average value of score of a plurality of playing results of a game based on game data that has been corrected by the correction unit 19 exceeds a predetermined threshold value, the determining unit 16 makes a determination regarding the prohibition of use of the game data. By doing this, even with game data that has been corrected by the correction unit 19, the game system 1*d* can still prohibit the use of game data having an excessively high level of difficulty and unclearable game data.

The server (including the server 200 and the servers 200*a* to 200*d*) of the above-described embodiments may be configured to include the correction unit 19. With this configuration as well, the game systems of the above-described embodiments (including the game systems 1*a* to 1*d*) can correct game data that has an excessively high level of difficulty to play well for the player who generated the game data, and game data that is unclearable.

Although the above has been a detailed description of embodiment of the present invention, making references to the drawings, the specific configuration is not restricted to those embodiments, and encompasses various changes of design and the like, to the extent that they do not go beyond the scope and spirit of the present invention.

Although the above-noted embodiments have been described for the example of a music game in which the score is calculated based on the coincidence between an instruction that moves an object OB in step with the music and the player operation, this is not a restriction. For example, in a racing game between cars, information generated by a player regarding the course may be taken as the above-described game data. Also, in a puzzle game in which there is a race against time to fit together pieces with diverse shapes into a predetermined shape, information generated by a player regarding the initial condition of the puzzle elements (for example, the shapes of the puzzle pieces) may be taken as the above-described game data. Also, in an action game in which there is a race with the clock to knock down successively appearing enemy characters and to reach a goal or to compete for the number of enemy characters knocked down, information such as the position of enemy characters generated by the player may be taken as the above-described game data.

Although, in each of the above-described embodiments, the examples shown are ones in which the server has a server storage unit (which includes the server storage unit 202 and the server storage unit 202b) or the cloud server 300 has the cloud storage unit 301, the system may be configured so that these elements of the configurations of or the units of the game system are provided in another device. Also, these elements of the configurations of or the units of the game system may be distributed among a plurality of device.

Also, the functions of each of the parts of the server may be implemented by downloading from another device a program for the purpose of implementing the functions of each of those parts, and the functions may be implemented by a program of another device.

Also, the functions of each of the parts of the terminal in each of the above-noted embodiment (these terminals including the terminal 100 and the terminals 100a to 100d) may be implemented by downloading from another device a program for the purpose of implementing the functions of each of those parts, and the functions may be implemented by a program of another device. Without having the game application installed in the terminal 100, if the terminal 100 includes at least the function of controlling reception and display of the game status, the progress of which is under the control of the server 200, and the function of controlling generation of instruction data that indicates instructions to the game and transmission of the generated instruction data to the server 200, the other functions may be implemented in the side of the server 200.

Also, each of the parts of the terminal control units (including the terminal control unit 10 and the terminal control units 10a to 10d) and each of the parts of the server 200 (collectively called the device control unit) or each of the parts of the device control unit in the above-noted embodiments may be implemented by dedicated hardware, or alternatively may be implemented by memory and a microprocessor.

The device control unit or each part thereof may be implemented by dedicated hardware, or alternatively the device control unit or each part thereof may be configured by a memory and a CPU (central processing unit), the functions of the device control unit or each part thereof being implemented by loading a program for implementing the functions thereof into memory and executing the program.

The program for implementing the functions of the device control unit or each part thereof may be recorded in a computer-readable storage medium and a computer system may be caused to read and execute the program stored in the storage medium so as to perform the processing of the device control unit or each part thereof. The term "computer system" as used herein includes, but is not necessarily limited to, an operating system and hardware such as peripheral devices.

The computer system may include a function of providing information in the format of a webpage coded in a mark-up language and a function of displaying that information with a browser.

The term "computer readable storage medium" as used herein may include, but is not necessarily limited to, a removable medium such as a flexible disc, an optomagnetic disk, a ROM, a CD-ROM, or the like, or a storage device such as a hard disc or the like that is built into a computer system. The term "computer-readable storage medium" may include one that dynamically holds a program for a given period of time, such as various devices included in a communication system that transmits a program via a network such as the Internet or by a communication circuit such as a telephone line, and also a device that holds a program, such as a volatile memory of a computer system that functions as a server or client in that case. The term "computer-readable storage medium" does not include a transitory propagating signal per se. The above-noted program may implement a part of the above-described functions, and further may implement the above-described functions in combination with a program already stored in a computer system.

What is claimed is:

1. A game system comprising: one or more memories storing one or more software components; and one or more processors, when executing the one or more software components, configured to at least:

generate game data, which is to be used in a game progression, based on player's instruction information input to a first terminal of a plurality of terminals;

make the game progression, using the game data generated;

calculate a score of a playing result based on a degree of coincidence between an operation instruction indicated by an object and an operation made by a player, wherein the object is an image that moves to cross a reference image on a display, and the image indicates operation instructions of an operation position, an operation type, and an operation timing of a player's operation;

compare the score of the playing result with a score threshold;

determine whether the game data is valid or invalid, based on whether the score of the playing result exceeds the score threshold;

determine whether the game data is permitted or prohibited to be used by at least a terminal other than the first terminal of the plurality of terminals, based on whether the game data is valid or invalid; and control the prohibition of use of the game data, based on the determination of whether the game data is permitted or prohibited to be used.

2. The game system according to claim 1, wherein the one or more processors are configured to determine prohibition of uploading to supply the game data generated by the one or more processors from the first terminal to a server capable of communicating via a communication network with the plurality of terminals, the prohibition of uploading being determined as the prohibition of use of the game data.

3. The game system according to claim 2, wherein the one or more processors are configured to determine prohibition of a storage unit that stores the game data from storing the game data generated by the one or more processors, the prohibition of the storage unit being determined as the prohibition of the use of the game data.

4. The game system according to claim 3, wherein the one or more processors are configured to correct the game data, based on at least one playing result for a player that plays the game that progresses by using the game data generated based on player's instruction information.

5. The game system according to claim 2, wherein the one or more processors are configured to correct the game data, based on at least one playing result for a player that plays the game that progresses by using the game data generated based on player's instruction information.

6. The game system according to claim 1, wherein the one or more processors are configured to determine prohibition of downloading to supply the game data generated by the one or more processors from a server capable of communicating via a communication network with a terminal to a terminal, the prohibition of downloading being determined as the prohibition of the use of the game data.

7. The game system according to claim 6, wherein the one or more processors are configured to correct the game data, based on at least one playing result for a player that plays the game that progresses by using the game data generated based on player's instruction information.

8. The game system according to claim 1, wherein the one or more processors are configured to determine prohibition of the game progression using the game data generated by the one or more processors, the prohibition of the game progression being determined as the prohibition of the use of the game data.

9. The game system according to claim 8, wherein the one or more processors are configured to correct the game data, based on at least one playing result for a player that plays the game that progresses by using the game data generated based on player's instruction information.

10. The game system according to claim 1, wherein the one or more processors are configured to make a determination to prohibit the use of the game data generated by the one or more processors, if the playing results do not satisfy a given condition.

11. The game system according to claim 10, wherein the one or more processors are configured to correct the game data, based on at least one playing result for a player that plays the game that progresses by using the game data generated based on player's instruction information.

12. The game system according to claim 1, wherein the one or more processors are configured to correct the game data, based on at least one playing result for a player that plays the game that progresses by using the game data generated based on player's instruction information.

13. The game system according to claim 12, wherein the one or more processors are configured to correct the game data generated, based on one playing result or on an average of a plurality of playing results.

14. The game system according to claim 12, wherein the one or more processors are configured to correct the game data by changing information indicating the timing of input of player's instruction information that is included in the game data, the game data being corrected based on at least one playing result.

15. The game system according to claim 12, wherein the the one or more processors are configured to make a determination regarding prohibition of use of the game data, based on at least one playing result of the game by using the corrected game data.

16. The game system according to claim 1, wherein the the one or more processors are configured to make a determination regarding prohibition of use of the game data, based on the difference between a first timing of input of player's instruction information included in the game data and a second timing of input of player's instruction information by a player that plays the game by using the game data.

17. A game method comprising:
generating game data for use in progressing through a game, based on player's instruction information input to a first terminal of a plurality of terminals;
progressing through the game using the generated game data;
calculating a score of a playing result based on a degree of coincidence between an operation instruction indicated by an object and an operation made by a player, wherein the object is an image that moves to cross a reference image on a display, and the image indicates operation instructions of an operation position, an operation type, and an operation timing of a player's operation;
comparing the score of the playing result with a score threshold;
determining whether the game data is valid or invalid, based on whether the score of the playing result exceeds the score threshold;
determining whether the game data is permitted or prohibited to be used by at least a terminal other than the first terminal of the plurality of terminals, based on whether the game data is valid or invalid; and
controlling the prohibition of use of the game data, based on the determination of whether the game data is permitted or prohibited to be used.

18. A non-transitory computer-readable storing medium that stores a program to be executed to perform a game method, the game method comprising:
generating game data for use in progressing through a game, based on player's instruction information input to a first terminal of a plurality of terminals;
progressing through the game using the generated game data;
calculating a score of a playing result based on a degree of coincidence between an operation instruction indicated by an object and an operation made by a player, wherein the object is an image that moves to cross a reference image on a display, and the image indicates operation instructions of an operation position, an operation type, and an operation timing of a player's operation;
comparing the score of the playing result with a score threshold;
determining whether the game data is valid or invalid, based on whether the score of the playing result exceeds the score threshold;
determining whether the game data is permitted or prohibited to be used by at least a terminal other than the first terminal of the plurality of terminals, based on whether the game data is valid or invalid; and
controlling the prohibition of use of the game data, based on the determination of whether the game data is permitted or prohibited to be used.

* * * * *